US011999112B2

(12) United States Patent
Nakamura et al.

(10) Patent No.: US 11,999,112 B2
(45) Date of Patent: Jun. 4, 2024

(54) COMPOSITE STRUCTURE AND MANUFACTURING METHOD THEREFOR

(71) Applicant: DIC Corporation, Tokyo (JP)

(72) Inventors: Kenji Nakamura, Ichihara (JP); Kenta Hiwatashi, Ichihara (JP); Hideaki Kikuchi, Minamisaku-gun (JP)

(73) Assignee: DIC Corporation, Tokyo (JP)

( * ) Notice: Subject to any disclaimer, the term of this patent is extended or adjusted under 35 U.S.C. 154(b) by 895 days.

(21) Appl. No.: 17/046,515

(22) PCT Filed: Apr. 4, 2019

(86) PCT No.: PCT/JP2019/014939
§ 371 (c)(1),
(2) Date: Oct. 9, 2020

(87) PCT Pub. No.: WO2019/198610
PCT Pub. Date: Oct. 17, 2019

(65) Prior Publication Data
US 2021/0162680 A1 Jun. 3, 2021

(30) Foreign Application Priority Data
Apr. 10, 2018 (JP) .................. 2018-075374

(51) Int. Cl.
*B29C 65/00* (2006.01)
*B29C 45/14* (2006.01)
(Continued)

(52) U.S. Cl.
CPC ........ *B29C 66/72321* (2013.01); *B29C 45/14* (2013.01); *B29C 65/405* (2013.01);
(Continued)

(58) Field of Classification Search
None
See application file for complete search history.

(56) References Cited

U.S. PATENT DOCUMENTS

| 2011/0111214 A1 | 5/2011 | Endo et al. |
| 2015/0108088 A1* | 4/2015 | Naritomi ................... C23F 1/26 216/52 |

(Continued)

FOREIGN PATENT DOCUMENTS

| CN | 104717831 A * | 6/2015 | ............ B32B 15/08 |
| JP | 2007-050630 A | 3/2007 | |

(Continued)

OTHER PUBLICATIONS

International Search Report dated Jun. 25, 2019, issued for PCT/JP2019/014939.
(Continued)

*Primary Examiner* — Seyed Masoud Malekzadeh
*Assistant Examiner* — Vipul Malik
(74) *Attorney, Agent, or Firm* — Locke Lord LLP; James E. Armstrong, IV; Nicholas J. DiCeglie, Jr.

(57) ABSTRACT

Provided are a composite structure that is formed by joining a metal member and a molded article of a polyarylene sulfide resin composition and is more excellent in terms of joint strength and heat cycle resistance and a producing method therefor. More specifically, provided are a composite structure formed by joining a surface-roughened metal member and a PPS member, in which a number average value of developed area ratios (Sdr) of an interface measured at five random points on a surface of the surface-roughened metal member using a confocal microscope based on ISO 25178 is 5 [%] or more, and a melt viscosity of a PPS resin is 15 to 500 [Pa·s], and a producing method therefor.

14 Claims, 3 Drawing Sheets

(51) Int. Cl.
*B29C 65/40* (2006.01)
*B29C 65/70* (2006.01)
*B29K 81/00* (2006.01)
*B29K 705/00* (2006.01)
*B32B 15/082* (2006.01)
*B32B 27/20* (2006.01)
*C08L 81/02* (2006.01)

(52) U.S. Cl.
CPC ............ *B29C 65/70* (2013.01); *B32B 15/082* (2013.01); *B32B 27/20* (2013.01); *C08L 81/02* (2013.01); *B29C 2045/14868* (2013.01); *B29K 2081/04* (2013.01); *B29K 2705/00* (2013.01); *B32B 2307/538* (2013.01)

(56) References Cited

U.S. PATENT DOCUMENTS

2015/0224742 A1\* 8/2015 Inoue .................. C09D 125/06
428/458

2016/0221301 A1\* 8/2016 Okumura ................. B32B 7/04

FOREIGN PATENT DOCUMENTS

| JP | 2014-240134 A | | 12/2014 | |
|----|----|----|----|----|
| JP | 2014240134 A | \* | 12/2014 | ............ B29C 45/14 |
| JP | 2015010158 A | \* | 1/2015 | |
| JP | 6132669 B2 | | 5/2017 | |
| WO | 2009/031632 A1 | | 3/2009 | |
| WO | 2013/128595 A1 | | 9/2013 | |
| WO | 14/081041 A1 | | 5/2014 | |
| WO | WO-2014081041 A1 | \* | 5/2014 | ............ C25D 1/04 |
| WO | 15/037718 A1 | | 3/2015 | |

OTHER PUBLICATIONS

Supplementary European Search Report dated Dec. 21, 2021, issued for European Patent Application No. 19786150.3.

\* cited by examiner

COMPOSITE STRUCTURE AND MANUFACTURING METHOD THEREFOR

TECHNICAL FIELD

The present invention relates to a composite structure having a molded article formed by melting and molding a polyarylene sulfide resin composition and a surface-roughened metal member joined together and a producing method therefor.

BACKGROUND ART

Polyarylene sulfide (hereinafter, abbreviated as "PAS" in some cases) resins represented by polyphenylene sulfide (hereinafter, abbreviated as "PPS" in some cases) resins are known to exhibit excellent heat resistance enabling the polyarylene sulfide resins to withstand a melting point of 270° C. or higher and to be excellent in terms of mechanical strength, chemical resistance, molding workability, and dimensional stability. Therefore, additives such as a reinforcing filler and an elastomer are blended with a PAS resin and are melted and kneaded to be dispersed into the matrix of the PAS resin to produce a PAS resin composition, and the PAS resin composition is worked into a variety of molded articles such as electric and electronic equipment components and automobile components by melting and molding.

Highly heat-resistant resin members represented by the PAS resins are in use as a substitute for metal members from the viewpoint of the weight reduction of a variety of components. However, in a case where it is difficult to substitute all metal members with a resin member due to a problem of mechanical strength or the like, a composite structure obtained by joining and integrating a metal member and the resin member is used.

As such a composite structure, known is, for example, a method in which the surface of a metal member is roughened and then a resin composition is used and joined thereto by an anchor effect. For example, known are composite structures obtained by producing an aluminum alloy or magnesium alloy having a recess portion of the order of nanometers to micrometers on a metal surface by jointly using a chemical treatment in which a corrosive aqueous solution or a corrosive suspension is used or an anodization method, performing injection molding of a resin composition on the aluminum alloy or magnesium alloy, and fixing the resin composition in a state of infiltrating the roughened recess portion (refer to Patent Documents 1 to 4).

The joint strengths or heat cycle resistances of the composite structures produced by such a method depend on the uneven shape of the metal surface and the type of the resin, but are not favorable enough to be adopted for a variety of molded articles such as electric and electronic equipment components and automobile components. Therefore, it has been desired to develop a metal/resin composite structure being more excellent in terms of joint strength and heat cycle resistance.

CITATION LIST

Patent Literature

PTL 1: WO2013/128595
PTL 2: JP-A-2007-050630
PTL 3: WO2009/031632
PTL 4: WO2015/037718

SUMMARY OF INVENTION

Technical Problem

Therefore, an object to be achieved by the present invention is to provide a composite structure that is formed by joining a metal member and a resin member made of a molded article of a polyarylene sulfide resin composition and is more excellent in terms of joint strength and heat cycle resistance and a producing method therefor.

In addition, another object to be achieved by the present invention is to provide a polyarylene sulfide resin composition capable of providing the composite structure, a resin member made of a molded article of the polyarylene sulfide resin composition, and a producing method therefor.

Solution to Problem

Therefore, as a result of intensive studies, the present inventors paid attention to a polyarylene sulfide resin having a melt viscosity in a specific range and to a three-dimensional surface roughness defined by ISO 25178 as an uneven shape of a metal surface suitable for the polyarylene sulfide resin, found that it becomes possible to provide a composite structure being excellent in terms of joint strength and heat cycle resistance by setting the developed area ratio (Sdr) of the interface within a specific range, and completed the present invention.

That is, (1) the present invention relates to a composite structure including a surface-roughened metal member and a resin member made of a molded article formed by melting and molding a polyarylene sulfide resin composition containing a polyarylene sulfide resin, which are joined to each other, in which a number average value (percentage) of developed area ratios (Sdr) of an interface measured at five random points on a surface of the surface-roughened metal member using a confocal microscope based on ISO 25178 is 5 [%] or more, and a melt viscosity of the polyarylene sulfide resin (a melt viscosity measured using a capillary type flow tester after holding the polyarylene sulfide resin at 300° C. for six minutes with a load of $1.96 \times 10^6$ Pa and L/D=10 (mm)/1 (mm)) is 15 [Pa·s] or more and 500 [Pa·s] or less.

In addition, (2) the present invention relates to a resin member that is usable for the composite structure, in which the resin member is made of a molded article formed by melting and molding a polyarylene sulfide resin composition containing a polyarylene sulfide resin.

In addition, (3) the present invention relates to a polyarylene sulfide resin composition that is usable for the resin member according to (2), in which the resin member is a polyarylene sulfide resin composition containing a polyarylene sulfide resin.

In addition, (4) the present invention relates to a method for producing a composite structure in which a surface-roughened metal member is jointed to a resin member made of a molded article formed by melting and molding a polyarylene sulfide resin composition containing a polyarylene sulfide resin, including a step (α) of melting and molding the polyarylene sulfide resin composition on a surface of the metal member to perform joining or a step (β) of joining the surface of the metal member and the molded article, in which a number average value (percentage) of developed area ratios (Sdr) of an interface measured at five random points in surface-roughened metal using a confocal microscope based on ISO 25178 is 5 [%] or more, and a melt viscosity of the polyarylene sulfide resin (a melt viscosity measured using a capillary type flow tester after holding the polyarylene sulfide resin at 300° C. for six minutes with a load of $1.96 \times 10^6$ Pa and L/D=10 (mm)/1 (mm)) is 15 [Pa·s] or more and 500 [Pa·s] or less.

In addition, (5) the present invention relates to a method for producing the resin member according to (2), including a step of melting and molding a polyarylene sulfide resin composition containing a polyarylene sulfide resin to obtain a molded article for the resin member.

In addition, (5) the present invention relates to a method for producing the polyarylene sulfide resin composition according to (3), including a step of melting and kneading a polyarylene sulfide resin as an essential component.

Advantageous Effects of Invention

According to the present invention, it is possible to provide a metal/polyarylene sulfide resin composite structure that is formed by joining a metal member and a molded article of a polyarylene sulfide resin composition and is more excellent in terms of joint strength and heat cycle resistance and a producing method therefor. In addition, according to the present invention, it is possible to provide a polyarylene sulfide resin composition capable of providing the composite structure, a resin member made of a molded article of the polyarylene sulfide resin composition, and production methods therefor.

DESCRIPTION OF EMBODIMENTS (Composite Structure)

Figure 1:
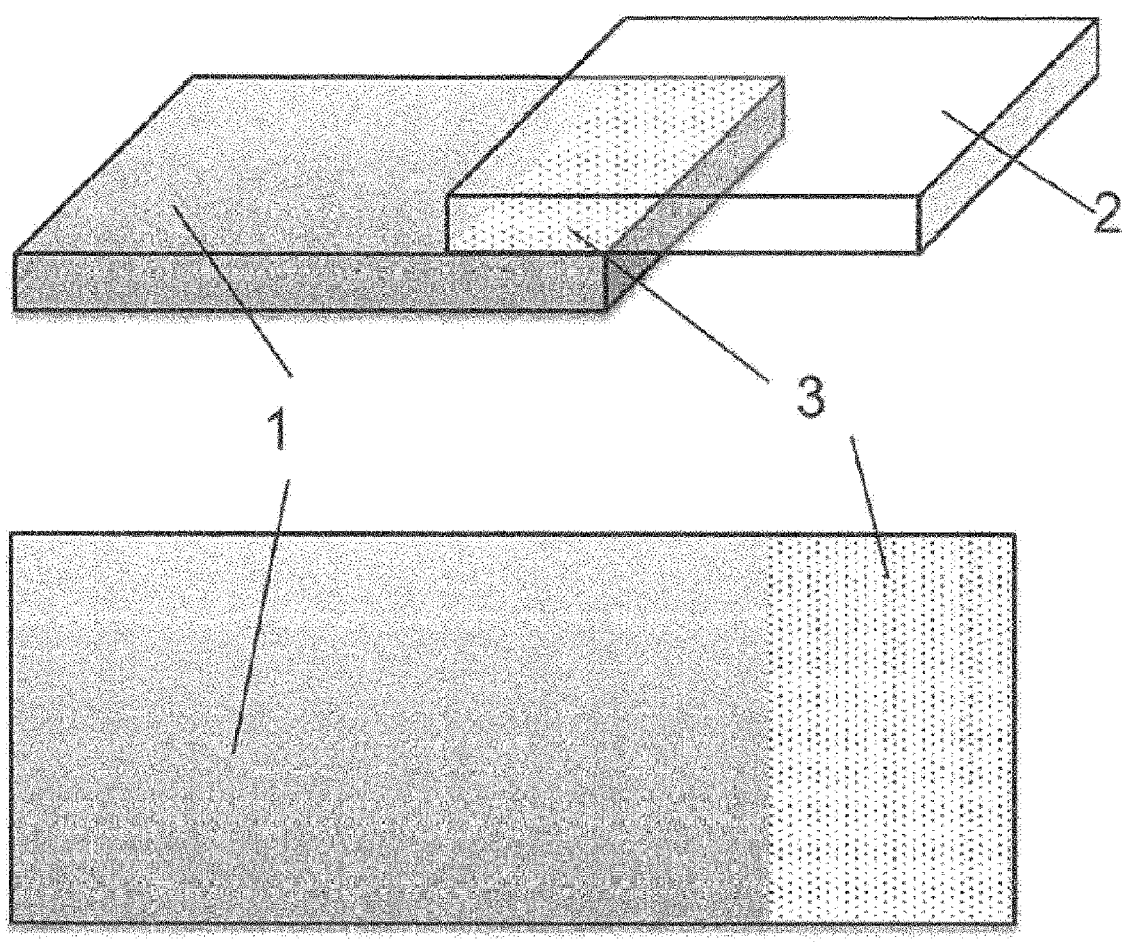
FIG. 1 is a schematic view of a metal member/polyarylene sulfide resin composite structure that is one embodiment of the present invention.
Figure 2:
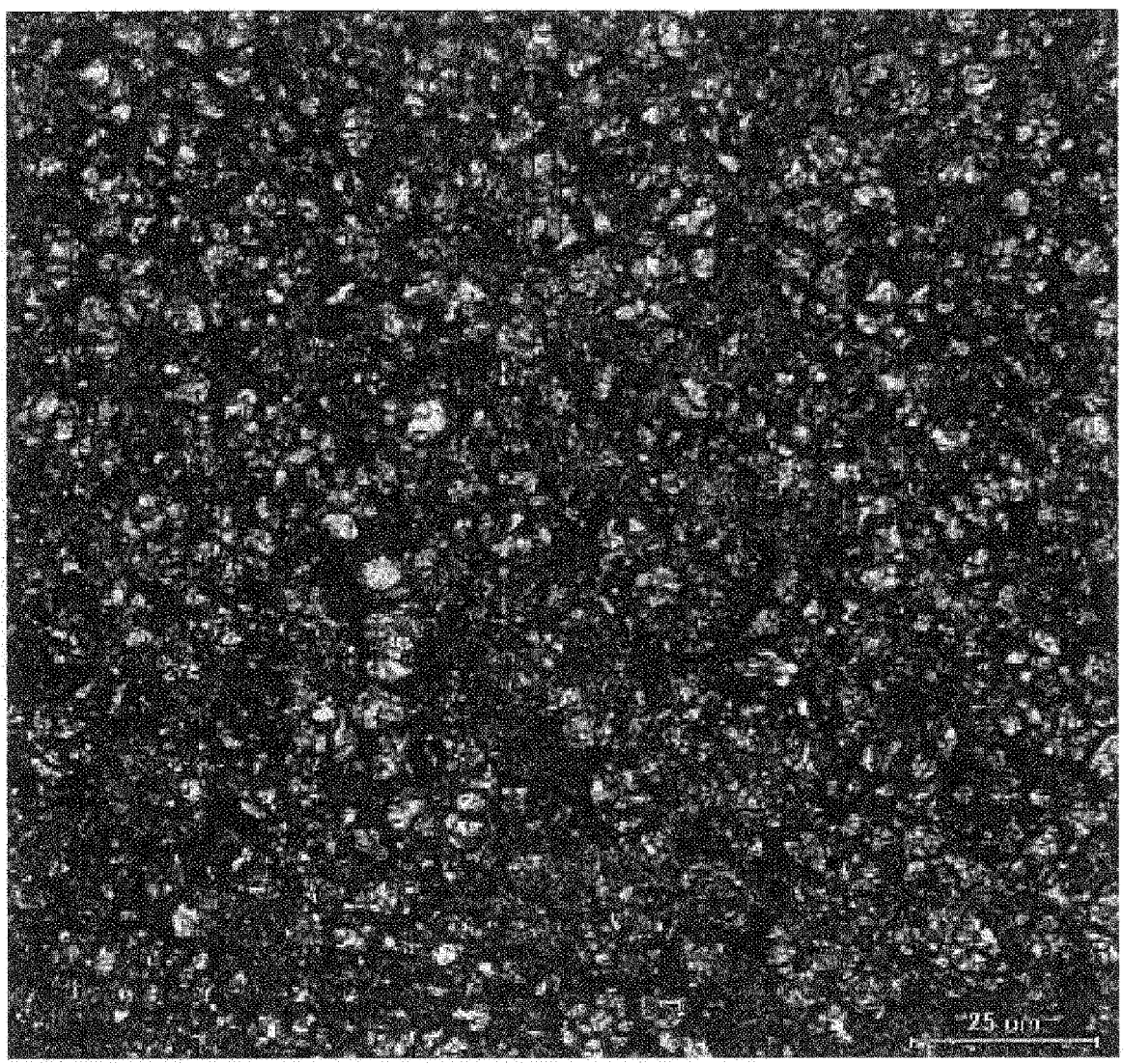
FIG. 2 is a confocal microscopic observation image of a roughened metal surface of a metal member B-1.
Figure 3:
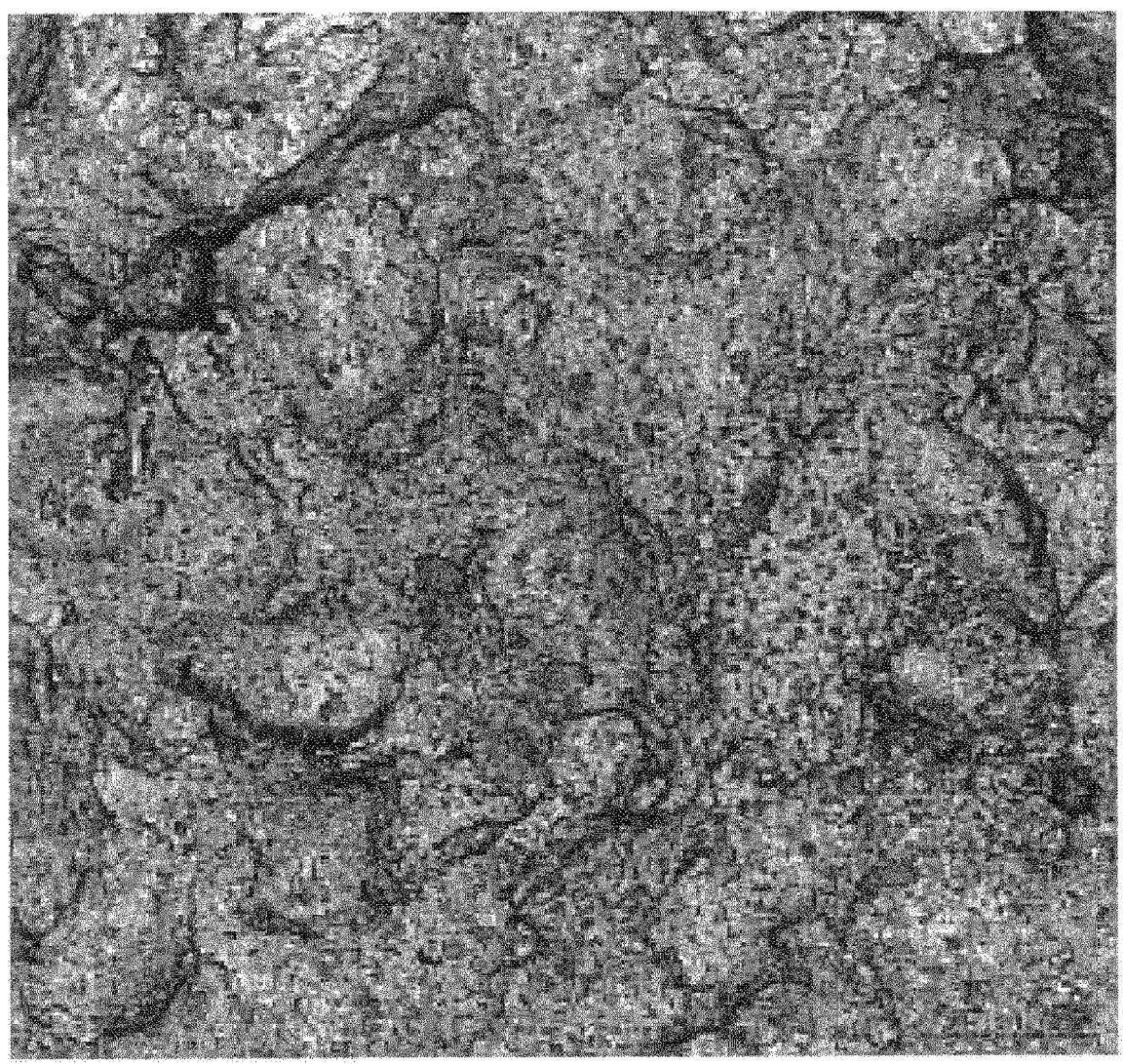
FIG. 3 is a confocal microscopic observation image of a roughened metal surface of a metal member B-3.

A composite structure of the present invention is formed by joining a metal member (1) having a roughened surface and a molded article (2) formed by melting and molding a resin composition containing a polyarylene sulfide resin.

In the present invention, surface roughening of the metal member is essential. The surface-roughened portion (surface-roughened portion) of the metal member (1) and the molded article (2) form a joint surface (3) and are joined together. In the composite structure, the number average value (percentage) of "the developed area ratios (Sdr) of the interface" measured at five random points on the surface of the surface-roughened metal member using a confocal microscope based on ISO 25178 (hereinafter, simply referred to as "the developed area ratio (Sdr) of the interface" in some cases) is 5 [%] or more.

(Metal Member (1))

Hereinafter, the surface-roughened metal member (1) will be described.

[Type of Metal]

Any well-known metal members can be used regardless of the types of metal members. That is, aluminum, copper, stainless steel, magnesium, iron, titanium, or alloys containing aluminum, copper, stainless steel, magnesium, iron, or titanium are exemplified. More specifically, iron, alloys containing iron such as stainless steel or an iron material as a main component, that is, in a proportion of 20% by mass or more, more preferably 50% by mass or more, and still more preferably 80% by mass, and additionally containing carbon, silicon, manganese, chromium, tungsten, molybdenum, phosphor, titanium, vanadium, nickel, zirconium, boron, or the like (hereinafter, iron alloys), aluminum, alloys containing aluminum as a main component and additionally containing copper, manganese, silicon, magnesium, zinc, or nickel (hereinafter, aluminum alloys), magnesium, alloys containing magnesium as a main component and additionally containing zinc, aluminum, zirconium, or the like (hereinafter, magnesium alloys), copper, copper alloys containing copper as a main component and additionally containing zinc, tin, phosphorus, nickel, magnesium, silicon, or chromium (hereinafter, copper alloys), titanium, and alloys containing titanium as a main component and additionally containing copper, manganese, silicon, magnesium, zinc, or nickel (hereinafter, titanium alloys) are exemplified. Among these metals and alloys, iron, iron alloys, aluminum alloys, magnesium alloys, copper alloys, and titanium alloys are more preferably exemplified, and iron alloys, aluminum alloys, and magnesium alloys are still more preferably exemplified.

[Method for Surface Roughening]

In addition, as long as the developed area ratio (Sdr) of the interface can be adjusted in a predetermined range, it is possible to use any well-known methods as the method for the surface roughening of the metal member, and examples thereof include (1) an immersion method in which a corrosive aqueous solution or a corrosive suspension is used, (2) an anodization method, and (3) mechanical cutting by blasting or laser working.

However, as a roughening method for increasing the developed area ratio (Sdr) of the interface, (1) the immersion method in which a corrosive aqueous solution or a corrosive suspension is used or (2) the anodization method is particularly preferable.

The metal member is preferably worked into a predetermined shape by plastic working such as cutting or pressing, punching, or thinning such as cutting, grinding, or electro-discharge machining of the metal member before the formation of the above-mentioned fine uneven surface.

A primer layer may be formed on the surface of the metal member that has been subjected to a surface treatment of metal. The material that configures the primer layer is not particularly limited; however, ordinarily, the primer layer is made of a primer resin material containing a resin component. The primer resin material is not particularly limited, and it is possible to use well-known materials. Specific examples thereof include polyolefin-based primers, epoxy-based primers, urethane-based primers, and the like that are well known. The method for forming the primer layer is not particularly limited, and the primer layer can be formed by, for example, applying a solution of the primer resin material or an emulsion of the primer resin material to the metal member that has been subjected to the surface treatment. Examples of a solvent that is used to produce the solution include toluene, methyl ethyl ketone (MEK), dimethylformamide (DMF), and the like. Examples of a medium for the emulsion include an aliphatic hydrocarbon medium, water, and the like.

[Evaluation of Developed Area Ratio (Sdr) of Interface on Metal Surface]

The developed area ratio (Sdr) of the interface means the spread of the surface area due to the surface roughening of the metal and is one surface roughness defined by ISO 25178. As the surface area of the metal member increases due to the surface roughening, the anchor effect with resins that can be joined becomes stronger, and furthermore, the joint strength of an integrally molded article made of the metal and a resin becomes higher. Therefore, in the surface-roughened metal member that is used in the composite structure of the present invention, the number average value (percentage) of the developed area ratios (Sdr) of the interface measured at five random points on the surface to be joined using a confocal microscope based on ISO 25178 needs to be 5 [%] or more and is more preferably 15 [%] or more. The upper limit value is not particularly limited as described above, but is preferably 150 [%] or less since it is possible to suppress material fracture by preventing stress concentration at an end point of an uneven portion on the metal surface.

The developed area ratio (Sdr) of the interface is surface roughness and thus can be evaluated with a confocal microscope. The use of the visible light wavelengths provides a resolution in the height direction of the order of sub-micrometers and a visual field range of the order of sub-millimeters, which makes it possible to evaluate the three-dimensional structure, which is most important in consideration of the anchor effect of the resin that enters the fine uneven surface of the surface-roughened metal.

The confocal microscope mentioned above includes a white confocal microscope and a monochromatic laser microscope.

The measurement of the developed area ratio (Sdr) of the interface using the confocal microscope is based on ISO 25178 that is effective as of 2018, and furthermore, regarding matters not mentioned, description will be supplemented as described below. First, the visual field range of the microscope will be described. It is preferable to secure a visual field range that is sufficiently longer than the repeating length of the unevenness on the metal surface. As the repeating length, the average length (RSm) of roughness curve elements that are obtained with a stylus-type roughness meter described below is adopted. The visual field range of the microscope is preferably a visual field range obtained using an objective lens in the microscope that is as long as twice or more and 20 times or less the average length (RSm) of the roughness curve elements and more preferably a visual field range obtained using an objective lens that is as long as three times or more and 10 times or less the average length (RSm) of the roughness curve elements.

When evaluated with an appropriate visual field range and an appropriate height resolution in the above-described manner, an appropriate height scan three-dimensional image of the surface of the roughened metal member can be obtained with the confocal microscope. However, in order to prevent the developed area ratio (Sdr) of the interface from being changed by filtering performed on the three-dimensional image during analysis, it is preferable to apply surface filters (an S filter and an L filter) to the original surface and apply the same cut-off wavelengths as in JIS-B 0601-2001 as the surface filters. That is, it is preferable to apply a low cutoff λs to the S filter, apply a high cutoff wavelength λc to the L filter, then, perform a median filter treatment, in which the filter size is 3×3, on the entire surface of the obtained S-L surface as the evaluation region, and calculate the developed area ratio (Sdr) of the interface of the metal member with respect to the obtained measurement surface.

In consideration of the fact that the visual field range that is observable in a single microscopic observation is appropriately 100 to 500 μm and thus it is practically difficult to evaluate the developed area ratios (Sdr) of interface in the entire metal member, in the present invention, it is preferable to perform evaluation at five random position points on the surface of the metal member, and it is more preferable to perform evaluation at five points of the center and four corners of the joint surface (3) between the metal member (1) and the molded article (2). In the present invention, the number average value of the developed area ratios at these five points is defined as the developed area ratio (Sdr) of the interface of the joint surface. The developed area ratio (Sdr) of the interface calculated by such a method has high reproducibility and is preferable as an index showing the degrees of roughening of the metal members that are roughened by different roughening methods.

In addition, from the viewpoint of preventing a measurement error caused by a difference in resolution or filtering arising from a difference in evaluation device, it is also preferable to use the ratio (Sdr1/Sdr0) of the number average value (Sdr1) of the developed area ratios (Sdr) of the interface at five random points on the surface of the surface-roughened metal member to the number average value (Sdr0) of the developed area ratios (Sdr) of the interface at five random points on the surface of the metal member before surface-roughening, i.e., before a step of roughening the surface of the metal member. The ratio (Sdr1/Sdr0) is preferably 7 or more and more preferably 20 or more. In addition, for the same reason as described above, the upper limit is not particularly set, but the ratio (Sdr1/Sdr0) is preferably 130 or less and more preferably 100 or less since it is possible to suppress material fracture by preventing stress concentration at an end point of the uneven portion on the metal surface.

In the measurement for calculating the ratio (Sdr1/Sdr0), the treatment with the surface filters or the median filter is not always necessary, but it is more preferable to perform the filter treatment.

[Evaluation of Maximum Height Roughness (Rz) and Average Length (RSm) of Elements of Roughness Curve with Stylus-Type Roughness Meter]

In the present invention, when the developed area ratio (Sdr) of the interface of the metal member (1) is calculated, it is possible to obtain the average length (RSm) of the elements of the roughness curve using a stylus-type roughness meter. This value can also be used to determine the visual field range of the confocal microscope that is used for the calculation of the developed area ratio (Sdr) of the interface. In addition, more preferably, it is also possible to obtain the maximum height roughness (Rz) of the roughness curve with the stylus-type roughness meter.

As the stylus-type roughness meter, a commercially available device can be used according to a conventional method. In the evaluation of the surface roughness of the metal member, it is preferable to calculate the maximum height roughness (Rz) and the average length (RSm) of the elements of the roughness curve by measuring four random straight line portions in the surface-roughened metal member based on JIS-B 0601-2001 (ISO 4287). The four random straight line portions may be measured according to a conventional method, but it is preferable to measure the portions, for example, under the following conditions. That is, a spherical indenter is used, and a tip radius of the indenter used is 2 μm or more and 10 μm or less and more preferably 2 μm or more and 5 μm or less. As the evaluation length, the reference length, the scanning rate, and the cut-off wavelength, appropriate values are selected for the arithmetic average roughness (Ra) of the roughness curve of the metal member. For example, in a case where the arithmetic average roughness (Ra) of the metal member is 0.1 μm or more and 2 μm or less, an evaluation length of 4 mm, a reference length of 0.8 mm, a scanning rate of 0.06 mm/s, and a low cutoff wavelength of 2.5 μm (Gaussian filter) are used. The measurement places with the stylus-type roughness meter are two random straight line portions that have a parallel relationship with each other on the roughened surface of the metal member and two random straight line portions that have a perpendicular relationship with the above-described straight line portions, and a value obtained by averaging the values of the above-described parameters in a total of four straight lines is used.

In the present invention, the average length (RSm) of the elements of the roughness curve is not particularly limited. However, when four random straight line portions in the surface-roughened metal member are measured using the stylus-type roughness meter based on ISO 4287, the number average value is preferably 10 μm or more and more preferably 30 μm or more. Meanwhile, the upper limit value is preferably less than 150 μm, more preferably less than 100 μm, and still more preferably less than 60 μm.

In addition, in the present invention, the maximum height roughness (Rz) of the roughness curve is not particularly limited. However, when four random straight line portions in the surface-roughened metal member are measured using the stylus-type roughness meter based on ISO 4287, the number average value is preferably 2 μm or more and more preferably 5 μm or more. Meanwhile, the upper limit value is preferably 30 μm or less and more preferably 20 μm or less.

(Resin Member (2))

The resin member (2) that is used in the present invention is made of a molded article formed by melting and molding a polyarylene sulfide resin composition containing a polyarylene sulfide resin. In addition, the production method for the resin member (2) that is used in the present invention has a step of obtaining the resin member made of the molded article formed by melting and molding a polyarylene sulfide resin composition containing a polyarylene sulfide resin. First, the polyarylene sulfide resin composition containing a polyarylene sulfide resin, which is a configurational element of the composite structure, will be described.

The polyarylene sulfide resin composition that is used in the present invention is a composition produced by blending a polyarylene sulfide resin as an essential component and other components as necessary, followed by melting and kneading. In addition, the method for producing the polyarylene sulfide resin composition that is used in the present invention has a step of blending a polyarylene sulfide resin as an essential component and other components as necessary, followed by melting and kneading.

The polyarylene sulfide resin that is used in the present invention is a resin having a resin structure in which the repeating unit is a structure in which an aromatic ring and a sulfur atom bond to each other and is specifically a resin having, as the repeating structure, a structural portion represented by General Formula (1)

[Chem. 1]

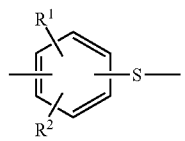

Formula (1)

(In the formula, $R^1$ and $R^2$ each independently represent a hydrogen atom, an alkyl group having 1 to 4 carbon atoms, a nitro group, an amino group, a phenyl group, a methoxy group, or an ethoxy group) and further having as necessary a trifunctional structural portion represented by General Formula (2).

[Chem. 2]

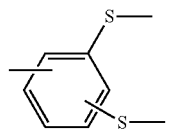

Formula (2)

The trifunctional structural portion represented by General Formula (2) is preferably 0.001 mol % or more and 3 mol % or less and particularly preferably 0.01 mol % and 1 mol % or less with respect to the total mole number of the other structural portion and the trifunctional structural portion.

Here, in the structural portion represented by General Formula (2), particularly, $R^1$ and $R^2$ in the formula are preferably hydrogen atoms from the viewpoint of the mechanical strength of the polyarylene sulfide resin, and, in this case, examples thereof include a hydrogen atom bonding to the aromatic ring in the para-site represented by Formula (3) and a hydrogen atom bonding to the aromatic ring in the meta-site represented by Formula (4).

[Chem. 3]

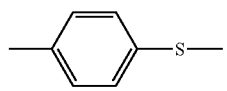

Formula (3)

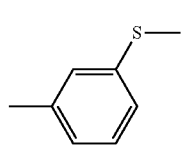

Formula (4)

Between these, particularly, regarding the bonding of the sulfur atom to the aromatic ring in the repeating structure, a structure in which the sulfur atom bonds to the aromatic ring in the para-site, which is represented by General Formula (3), is preferable in terms of the heat resistance or crystallinity of the polyarylene sulfide resin.

In addition, the polyarylene sulfide resin may include not only the structural portion represented by General Formula (1) or (2) but also structural portions represented by Structural Formulae (5) to (8)

[Chem. 4]

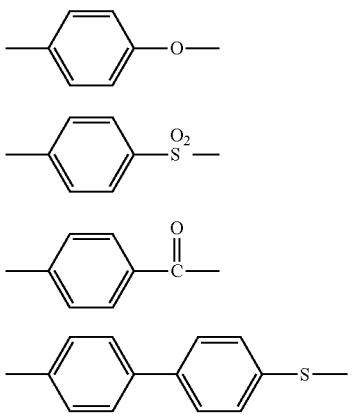

Formula (5)

Formula (6)

Formula (7)

Formula (8)

in an amount of 30% by mol or less of the total of the structural portions represented by General Formula (1) and General Formula (2). Particularly, in the present invention, the amount of the structural portions represented by General Formulae (5) to (8) is preferably 10% by mol or less in terms of the heat resistance and mechanical strength of the polyarylene sulfide resin. In a case where the polyarylene sulfide resin includes the structural portions represented by General Formulae (5) to (8), the bonding pattern thereof may be any of a random copolymer or a block copolymer.

In addition, the polyarylene sulfide resin may have a naphthyl sulfide bond or the like in the molecular structure, and the amount of the naphthyl sulfide bond or the like is preferably 3% by mol or less and particularly preferably 1% by mol or less with respect to the total mole number of the naphthyl sulfide bond and the other structural portion.

(Melt Viscosity)

For the polyarylene sulfide resin that is used in the present invention, the melt viscosity (V6) measured at 300° C. is 15 [Pa·s] or more, preferably 30 [Pa·s] or more and 500 [Pa·s] or less and preferably 80 [Pa·s] or less. Within this range, in a case where the polyarylene sulfide resin is joined to the surface-roughened metal member (1), the joint strength and the heat cycle resistance are excellent. In the present invention, the melt viscosity (V6) is defined as the value of the melt viscosity measured using a capillary type flow tester after holding the polyarylene sulfide resin at 300° C. for six minutes with a load of 1.96×10⁶ Pa and L/D=10 (mm)/1 (mm).

In addition, other physical properties of the polyarylene sulfide resin are not particularly limited as long as the effect of the present invention is not impaired and are as described below.

(Melting Point (Tm) and Recrystallization Temperature (Tc2))

The melting point (Tm) of the polyarylene sulfide resin is preferably 270° C. or higher and more preferably 270° C. or higher and 300° C. or lower since the polyarylene sulfide resin composition becomes excellent in terms of heat resistance or mechanical strength. In addition, the recrystallization temperature (Tc2) of the polyarylene sulfide resin is preferably 200° C. or higher and 260° C. or lower since the polyarylene sulfide resin composition becomes excellent in terms of heat resistance or mechanical strength.

(Non-Newtonian Index)

The non-Newtonian index of the polyarylene sulfide resin that is used in the present invention is not particularly limited as long as the effect of the present invention is not impaired, but is preferably 0.90 or more and 2.00 or less. In the case of using a linear polyarylene sulfide resin, the non-Newtonian index is preferably 0.90 or more and 1.50 or less and more preferably 0.95 or more and 1.20 or less. Such a polyarylene sulfide resin is excellent in terms of mechanical properties, fluidity, and abrasion resistance. Here, the non-Newtonian index (N value) is a value calculated according to the following formula after measuring the shear rate and shear stress using a capilograph at 300° C. under a condition of the ratio (L/D) of the orifice length (L) to the orifice diameter (D) of 40.

$$SR = K \cdot SS^N \qquad \text{[Math. 1]}$$

In the formula, SR represents the shear rate (sec-1), SS represents the shear stress (dyne/cm²), and K represents a constant. As the N value approaches one, the structure of PPS becomes more linear, and, as the N value increases, the structure has more branches.

(Production Method)

The production method for the polyarylene sulfide resin is not particularly limited, but examples thereof include 1) a method in which a dihalogeno-aromatic compound is polymerized in the presence of sulfur and sodium carbonate by adding a polyhalogeno-aromatic compound or a different copolymerization component if necessary, 2) a method in which a dihalogeno-aromatic compound is polymerized in a polar solvent in the presence of a sulfiding agent or the like by adding a polyhalogeno-aromatic compound or a different copolymerization component if necessary, 3) a method in which p-chlorothiophenol is self-condensed by adding a different copolymerization component if necessary, 4) a method in which an aromatic diiodide and pure sulfur are melt-polymerized while being depressurized in the presence of a polymerization inhibitor that may have a functional group such as a carboxy group or an amino group, and the like. Among these methods, the method 2) is versatile and preferable. During the reaction, an alkali metal salt of carboxylic acid or sulfonic acid or alkali hydroxide may be added to adjust the degree of polymerization. Regarding the method 2), the polyarylene sulfide resin is particularly preferable obtained by a method in which the polyarylne sulfide resin is produced by introducing a water-containing sulfiding agent to a mixture containing a heated organic polar solvent and a dihalogeno-aromatic compound at a rate at which water can be removed from a reaction mixture, reacting the dihalogeno-aromatic compound and the sulfiding agent in the organic polar solvent by adding a polyhaologeno-aromatic compound if necessary, and controlling the amount of moisture in the reaction system to 0.02 mol or more and 0.5 mol or less with respect to 1 mol of the organic polar solvent (refer to JP-A-07-228699) or a method in which alkali metal hydrosulfide and an alkali metal salt of organic acid are reacted by adding a dihalogeno-aromatic compound and, if necessary, a polyhalogeno-aromatic compound or a different copolymerization component in the presence of a solid-form alkali metal sulfide and an aprotic polar organic solvent while controlling the alkali metal salt of organic acid to 0.01 mol or more and 0.9 mol or less with respect to 1 mol of a sulfur source and controlling the amount of moisture in the reaction system to 0.02 mol or less with respect to 1 mol of the aprotic polar organic solvent (refer to WO2010/058713). Specific examples of the dihalogeno-aromatic compound include p-dihalobenzene, m-dihalobenzene, o-dihalobenzene, 2,5-dihalotoluene, 1,4-dihalonaphthalene, 1-methoxy-2,5-dihalobenzene, 4,4'-dihalobiphenyl, 3,5-dihalobenzoic acid, 2,4-dihalobenzoic acid, 2,5-dihalonitrobenzene, 2,4-dihalonitrobenzene, 2,4-dihaloanisole, p,p'-dihalodiphenyl ether, 4,4'-dihalobenzophenone, 4,4'-dihalodiphenyl sulfone, 4,4'-dihalodiphenyl sulfoxide, 4,4'-dihalodiphenyl sulfide, and compounds having an alkyl group having 1 to 18 carbon atoms in an aromatic ring of each of the above-described compounds. Examples of the polyhalogeno-aromatic compound include 1,2,3-trihalobenzene, 1,2,4-trihalobenzene, 1,3,5-trihalobenzene, 1,2,3,5-tetrahalobenzene, 1,2,4,5-tetrahalobenzene, 1,4,6-trihalonaphthalene, and the like. In addition, the halogen atom that is contained in each of the above-described compounds is preferably a chlorine atom or a bromine atom.

The method for the post treatment of the reaction mixture containing the polyarylene sulfide resin obtained by the polymerization step is not particularly limited, and examples thereof include (1) a method in which, after the completion of the polymerization reaction, first, the solvent is distilled away under reduced pressure or at normal pressure from the reaction mixture as it is or the reaction mixture to which an acid or a base has been added, next, the solid matter from which the solvent has been distilled away is washed once or more with a solvent such as water, a reaction solvent (or an organic solvent having an equivalent solubility to low-molecular-weight polymers), acetone, methyl ethyl ketone, or alcohol, furthermore, the solid matter is neutralized, washed with water, filtered, and dried, (2) a method in which, after the completion of the polymerization reaction, a solvent such as water, acetone, methyl ethyl ketone, alcohol, ether, halogenated hydrocarbon, aromatic hydrocarbon, or aliphatic hydrocarbon (a solvent that is soluble in the polymerization solvent used and is a poor solvent for at least polyarylene sulfide) is added to the reaction mixture as a precipitation agent to precipitate a solid-form product such as polyarylene sulfide or an inorganic salt, and the solid-form product is filtered, washed, and dried, (3) a method in which, after the completion of the polymerization reaction, a reaction solvent (or an organic solvent having an equivalent solubility to low-molecular-weight polymers) is added to the reaction mixture and kneaded, then, the reaction mixture is filtered to eliminate a low-molecular-weight polymer, then, washed once or more with a solvent such as water, acetone, methyl ethyl ketone, or alcohol, and then neutralized, washed with water, filtered, and dried, (4) a method in which, after the completion of the polymerization reaction, the reaction mixture is washed with water by adding water, filtered, treated with an acid as necessary by adding an acid during the water washing, and dried, (5) a method in which, after the completion of the polymerization reaction, the reaction mixture is filtered, washed with a reaction solvent once or more as necessary, furthermore, washed with water, filtered, and dried, and the like.

Furthermore, in the post treatment methods as exemplified in the (1) to (5), the polyarylene sulfide resin may be dried in a vacuum or may be dried in the air or in an inert gas atmosphere such as nitrogen.

The polyarylene sulfide resin composition of the present invention can be melted and kneaded as necessary after a filler (B) is blended as an optional component. As the filler, it is also possible to use a well-known conventional material as long as the effect of the present invention is not impaired, and examples thereof include fibrous fillers, granular or plate-like non-fibrous fillers, fillers having a variety of shapes, and the like. Specifically, it is possible to use a fibrous filler such as a glass fiber, a carbon fiber, a silane glass fiber, a ceramic fiber, an aramid fiber, a metal fiber, a fiber of potassium titanate, silicon carbide, calcium silicate, Wollastonite, or the like, or a natural fiber. In addition, it is also possible to use a non-fibrous filler such as glass beads, glass flakes, barium sulfate, clay, pyrophyllite, bentonite, sericite, mica, mica, talc, attapulgite, ferrite, calcium silicate, calcium carbonate, magnesium carbonate, glass beads, zeolite, milled fiber, or calcium sulfate.

In the case of blending the filler, the proportion of the filler blended is not particularly limited as long as the effect of the present invention is not impaired, varies depending on individual purposes, and cannot be generally defined. For example, with respect to 100 parts by mass of the polyarylene sulfide resin, the proportion is preferably 1 part by mass or more and 200 parts by mass or less and, furthermore, more preferably 10 parts by mass or more and 100 parts by mass or less. The proportion is preferably in the above-described range since the resin composition exhibits a favorable mechanical strength and favorable moldability.

In addition, the polyarylene sulfide resin composition of the present invention can also be melted and kneaded as necessary after an elastomer (C) is blended as an optional component. Examples of the elastomer (C) include thermoplastic elastomers such as polyolefin-based elastomers, fluorine-based elastomers, and silicone-based elastomers. In the case of blending the elastomer, the proportion of the elastomer blended is not particularly limited as long as the effect of the present invention is not impaired, varies depending on individual purposes, and cannot be generally defined. With respect to 100 parts by mass of the polyarylene sulfide resin, the proportion is preferably 0.01 parts by mass or more and 30 parts by mass or less and, furthermore, more preferably 0.1 parts by mass or more and 15 parts by mass or less. The proportion is preferably in the above-described range since the impact resistance of a polyarylene sulfide resin composition to be obtained improves.

Furthermore, the polyarylene sulfide resin composition of the present invention can also be melted and kneaded as necessary after a phenolic resin is blended as an optional component. The phenolic resin refers to a thermoplastic polymer having a phenolic skeleton. Any of a novolac-type phenolic resin or a bisphenol-type phenolic resin can be used as a preferable phenolic resin, and furthermore, a novolac-type phenolic resin is more preferable.

The hydroxyl equivalent of the phenolic resin is preferably as high as possible, and the range thereof may be a well-known range. Since it is possible to further improve the adhesive force or the sticking force, the hydroxyl equivalent of the phenolic resin is preferably 80 to 200 g/equivalent, more preferably 100 g/equivalent or more and 180 g/equivalent or less, and still more preferably 110 g/equivalent or more and 150 g/equivalent or less.

In addition, In the case of blending the phenolic resin, the proportion of the phenolic resin blended is not particularly limited as long as the effect of the present invention is not impaired, varies depending on individual purposes, and cannot be generally defined. With respect to 100 parts by mass of the polyarylene sulfide resin, the proportion is preferably 0.1 part by mass or more and 10 parts by mass or less and, furthermore, more preferably 1 part by mass or more and 3 parts by mass or less. The proportion is preferably in the above-described range since the joint strength of a composite structure to be obtained improves.

Since the blending of the phenolic resin is capable of decreasing the viscosity of the polyarylene sulfide resin composition and capable of improving the fluidity of the polyarylene sulfide resin composition during molding, the anchor effect can be enhanced by causing the composition to flow into fine portions of the unevenness on the adhesive surface of the metal member. Furthermore, the presence of a hydroxyl group is capable of forming a large number of hydrogen bonds on the adhesive surface of the metal member to improve the adhesive force. Furthermore, even under a high temperature and high humidity environment, it is possible to suppress the infiltration of moisture into the adhesive surface and to develop a high adhesion retention rate.

Furthermore, the polyarylene sulfide resin composition of the present invention may include as blended therein, in addition to the above-described components, the other synthetic resin than the polyarylene sulfide resin, the thermoplastic elastomer and the phenolic resin, as an optional component depending on applications thereof, and examples of the other synthetic resin include an epoxy resin, a polyester resin, a polyamide resin, a polyimide resin, a polyetherimide resin, a polycarbonate resin, a polyphenylene ether resin, a polysulfone resin, a polyethersulfone resin, a polyetheretherketone resin, a polyetherketone resin, a polyarylene resin, a polyethylene resin, a polypropylene resin, a polytetrafluorinated ethylene resin, a polydifluorinated ethylene resin, a polystyrene resin, an ABS resin, a phenolic resin, a urethane resin, a liquid crystal polymer, or the like (hereinafter, simply referred to as the synthetic resin). In the present invention, the synthetic resin is not an essential component; however, in a case where the synthetic resin is blended, the proportion of the synthetic resin blended is not particularly limited as long as the effect of the present invention is not impaired, varies depending on individual purposes, and cannot be generally defined. The synthetic resin may be used with an appropriate adjustment depending on purposes and applications so as not to impair the effect of the present invention such that, as the proportion of the resin components that are blended with the polyarylene sulfide resin composition of the present invention, the total of the polyarylene sulfide resin and the thermoplastic elastomer reaches 75.0% by mass or more and preferably reaches 80% by mass or more and 99.99% by mass or less, in other words, the synthetic resin reaches 25.0% by mass or less and preferably reaches 0.01% by mass or more and 20.0% by mass or less.

In addition, with the polyarylene sulfide resin composition of the present invention, well-known conventional additives such as a colorant, an antistatic agent, an antioxidant, a heat resistance stabilizer, an ultraviolet stabilizer, an ultraviolet absorber, a foaming agent, a flame retardant, a flame retardant aid, an antirust agent, and a coupling agent may be additionally blended as optional components as necessary. These additives are not essential components; however, in the case of blending these additives, the proportion of the additives blended is not particularly limited as long as the effect of the present invention is not impaired, varies depending on individual purposes, and cannot be generally defined. The additives may be used with an appropriate adjustment depending on purposes or applications so as not to impair the effect of the present invention while the proportion is, for example, preferably 0.01 parts by mass or more and 1,000 parts by mass or less with respect to 100 parts by mass of the polyarylene sulfide resin.

In the production method for the polyarylene sulfide resin composition of the present invention, the polyarylene sulfide resin is used as an essential component, other optional components are blended as necessary, and the resulting blend is melted and kneaded at a melting point of the polyarylene sulfide resin or higher.

In a preferable production method for the polyarylene sulfide resin composition of the present invention, the polyarylene sulfide resin composition can be produced by undergoing a step in which the polystyrene sulfide resin and the optional components are charged in a variety of forms such as a powder form, a pellet form, and a strip form into a ribbon blender, a Henschel mixer, a V blender, or the like so as to reach the above-described blending proportions, dry-blended, then, charged into a well-known melting kneader such as a Banbury mixer, a mixing roll, a single-screw or twin-screw extruder, or a kneader, and melted and kneaded in a temperature range in which the resin temperature reaches the melting point of the polyarylene sulfide resin or higher, preferably in a temperature range in which the resin temperature reaches the melting point plus 10° C. or higher, more preferably in a temperature range in which the resin temperature reaches the melting point plus 10° C. or higher and the melting point plus 100° C. or lower, and still more preferably in a temperature range in which the resin temperature reaches the melting point plus 20° C. or higher and the melting point plus 50° C. or lower. The respective components may be added to the melting kneader and mixed at the same time or may be added and mixed separately.

The melting kneader is preferably a twin-screw kneading extruder from the viewpoint of dispersibility and productivity, and the components are preferably melted and kneaded while appropriately adjusting, for example, the amount of the resin components discharged to 5 (kg/hr) or more and 500 (kg/hr) or less and the screw rotation rate to 50 (rpm) or higher to 500 (rpm) or lower, and the components are more preferably melted and kneaded under a condition in which the ratio thereof (the amount of the resin components discharged/the screw rotation rate) reaches 0.02 (kg/hr/rpm) or more and 5 (kg/hr/rpm) or less. In addition, in the case of adding, among the above-described components, the filler or the additive, the filler or the additive is preferably added to the inside of the twin-screw kneading extruder from a side feeder of the extruder from the viewpoint of dispersibility. Such a side feeder is preferably positioned such that the ratio of the distance from a resin feeding portion of the extruder to the side feeder to the total screw length of the twin-screw kneading extruder is 0.1 or more and 0.9 or less. Even in the above-described range, the ratio is particularly preferably 0.3 or more and 0.7 or less.

The polyarylene sulfide resin composition of the present invention that is obtained by melting and kneading as described above is a molten mixture containing the polyarylene sulfide resin, which is as the essential component, the optional components, which are added as necessary, and a component derived from the polyarylene sulfide resin and the optional components. The polyarylene sulfide resin composition is preferably worked into a pellet form, a chip form, a granular form, a powder form, or the like by a well-known method, then, preliminarily dried at a temperature of 100° C. or higher and 150° C. or lower as necessary, and subjected to a variety of types of molding.

The polyarylene sulfide resin composition of the present invention that is produced by the above-described production method forms a morphology in which the polyarylene sulfide resin forms the matrix and, if present, the optional components, which are added as necessary, are dispersed. As a result, it is possible to produce a polyarylene sulfide resin composition having excellent impact resistance, and additionally, it is possible to impart an additional value such as a high joint strength, high impact resistance, high dimensional stability, or the like to the metal/polyarylene sulfide composite structure made up of the metal member and the polyarylene sulfide resin composition.

The molded article that is used in the present invention is obtained by melting and molding the polyarylene sulfide resin composition. The polyarylene sulfide resin composition may be melted and molded by a well-known method, for example, a variety of molding methods such as injection molding, compression molding, extrusion molding of composite, sheet, pipe, or the like, pultrusion molding, blow molding, and transfer molding are applicable, and particularly, injection molding is suitable. In the case of molding the polyarylene sulfide resin composition by injection molding, a variety of molding conditions are not particularly limited, and ordinarily, it is possible to mold the polyarylene sulfide resin composition by an ordinary method. For example, in an injection molding machine, the polyarylene sulfide resin composition may be melted in a temperature range in which the resin temperature is the melting point of the polyarylene sulfide resin or higher, then, poured into a mold from a resin discharge opening, and molded. The temperature range is preferably the melting point plus 10° C. or higher, more preferably the melting point plus 10° C. or higher and the melting point plus 100° C. or lower, and still more preferably the melting point plus 20° C. or higher and the melting point plus 50° C. or lower. At that time, the mold temperature is also set to a well-known temperature range, for example, preferably room temperature (23° C.) or higher and 300° C. or lower, more preferably 40° C. or higher and 200° C. or lower, and most preferably 120° C. or higher and 180° C. or lower.

(Composite Structure and Producing Method Therefor)

The composite structure of the present invention can be produced by a well-known joining method as long as the surface-roughened metal member (1) and the resin member (2) made of the molded article formed by melting and molding the polyarylene sulfide resin composition containing the polyarylene sulfide resin are joined to each other. For example, the composite structure can be produced by a producing method having a step (α) of melting and molding the polyarylene sulfide resin composition on the surface of the metal member to perform joining or a step (β) of joining the surface of the metal member and the molded article of the polyarylene sulfide resin composition.

The joining method (α) includes a step of melting and molding the polyarylene sulfide resin composition on the surface of the metal member to perform joining between the both. Examples thereof include a method in which a so-called metal insert molding method is performed. The metal insert molding method has a step of inserting the metal member (1) into a mold of an injection molding machine and then performing the injection molding of the polyarylene sulfide resin composition on the surface-roughened portion of the metal member. In addition, another form of the metal insert molding may be so-called film insert molding in which a film-shaped metal member layer is inserted into a mold and the polyarylene sulfide resin composition is melted and molded. The apparatus and the producing method in the metal insert molding method or the film insert molding method are not particularly limited, a commercially available apparatus can be used, and the polyarylene sulfide resin composition may be molded according to a normal method. However, the polyarylene sulfide resin composition needs to be, for example, melted in an injection molding machine in a temperature range in which the resin temperature is the melting point of the polyarylene sulfide resin composition or higher, preferably the melting point or higher and the melting point plus 100° C. or lower, and more preferably the melting point plus 20° C. or higher and the melting point plus 50° C. or lower, then, poured into the mold from the resin discharge opening, and molded. At that time, the mold temperature may also be in a well-known temperature range, but can be set from a lower temperature. For example, the mold temperature can be set to room temperature (23° C.) to 300° C., preferably can be set to 40° C. or higher and 180° C. or lower, and preferably also can be set to 120° C. or higher and 180° C. or lower.

In addition, the joining method (β) includes a step of joining the surface of the metal member and the molded article of the polyarylene sulfide resin composition. In a state where the surface-roughened portion of the metal member (1) and the molded article formed by melting and molding the polyarylene sulfide resin composition are brought into contact with each other, the metal member and the molded article are heated to a temperature at which the polyarylene sulfide resin composition melts and are melted, thereby joining the metal member (1) and the molded article.

In the joining method (β), the polyarylene sulfide resin composition of the present invention is melted and molded in advance to produce a molded article. The obtained molded article is heated and joined in a state of being brought into contact with the surface-roughened portion of the metal member (1), and then cooled, thereby obtaining the composite structure. Examples of such a method include methods such as a hot plate welding method, a vibration welding method, an ultrasonic welding method, a high-frequency welding method, an induction heating welding method, a rotary welding method, a laser welding method, a hot pressing method, and a hot embossing method, and, as an apparatus that is used in these joining methods and a producing method, a commercially available apparatus can be used, and the polyarylene sulfide resin composition and the metal member may be joined to each other according to a normal method. For example, in the hot plate welding method, the surface of the molded article that is to be welded to the metal member is melted using a heat source such as a hot plate so as to create a temperature condition described below in order to melt the surface of the molded article, the molded article is joined to the metal member and then held in a pressurized state until the surface is cooled and solidified, whereby the molded article and the metal member are joined to each other. In addition, in vibration welding, ultrasonic welding, and high-frequency welding, the molded article is joined to the metal member, then, vibrations, ultrasonic waves, or high frequencies are transmitted to the molded article or the metal member to generate heat in order to create the temperature condition described below in order to melt the surface of the molded article that is to be welded to the metal member, the molded article is melted by the generated heat and held in a pressurized state until the molded article is cooled and solidified, whereby the molded article and the metal member are joined to each other. Regarding the method for transmitting vibrations, high frequencies, or ultrasonic waves, the molded article may be vibrated by irradiation or with a resonator or a vibrator brought into contact with the molded article, whereby heat is generated by the vibration of the molded article or the metal member or friction heat between the molded article and the metal member. Meanwhile, in induction heating welding, the molded article is joined to the metal member, then, the metal member is heated with an induction heating apparatus to generate heat so as to create the temperature condition described below in order to melt the surface of the molded article that is to be welded to the metal member, the molded article is melted and held in a pressurized state until the molded article is cooled and solidified, whereby the molded article and the metal member are joined to each other. In addition, in rotary welding, the molded article and the metal member are separately held, then, gradually brought close to each other while rotating one of the molded article and the metal member at a high speed of 100 rotations or more and 4,000 rotations or less, when the molded article and the metal member come into contact with each other, frictional heat is generated so as to create the temperature condition described below, the resin is melted and held in a pressurized state until the resin is cooled and solidified, whereby the molded article and the metal member are joined to each other.

In addition, the molded article of the polyarylene sulfide resin composition may be a film-shaped matter. In a case where the molded article of the polyarylene sulfide resin composition is a film-shaped matter, from the viewpoint of maintaining the smoothness or surface appearance of the film-shaped matter, particularly, a joining method described below that is called a hot pressing (thermal compression bonding) method or a melt extrusion method can be used, and furthermore, when the film-shaped matter is a transparent material capable of transmitting laser beams, it is also possible to use a joining method that is called a laser welding method.

That is, the hot pressing (thermal compression bonding) method or the hot embossing method is a method in which a film of a film-shaped polyarylene sulfide resin composition is thermally compressed against the metal member at a high temperature and a high pressure, and the film is thermally compressed by a method in which a heating roll or hot plate pressing is used. From the viewpoint of the production process, preferable is the method in which a heating roll is used.

In addition, in the case of the melt extrusion transfer method, the polyarylene sulfide resin composition is melted and extruded into a film shape with a melt extruder, then pressed against a shaping roll, and cooled and solidified while being compressed against the metal member. In addition, the laser welding method is applicable in a case where the molded article is capable of transmitting laser beams. After the molded article is joined to the metal member, laser beams are radiated from the molded article side to the surface of the metal member to generate heat so as to create the temperature condition described below, the molded article is melted and held in a pressurized state until the molded article is cooled and solidified, whereby the molded article and the metal member are joined to each other.

Meanwhile, the method for surface roughening is limited, but the metal member may be a film-shaped matter such as a metal foil. In a case where the metal member is a film-shaped matter, it is also possible to use the so-called hot embossing method in which the metal member is joined by performing embossing and foil stamping at the same time while the molded article of the polyarylene sulfide resin composition is heated. When the hot embossing method is used, it is possible to produce a molded article provided with a fine pattern having a three-dimensional shape, and, in a case where the fine pattern formed by the metal member is an electric circuit, it is possible to use the molded article as a molded circuit component.

It should be noted that, in the present invention, the term "film-shaped matter" is used to collectively refer to so-called foils, films, sheets, and plates and is defined as a matter having a thickness of 0.001 mm or larger and 9 mm or smaller.

In the joining method (B), since the molded article, basically, needs to be melted and compressed against the metal member, regarding the heating condition, the resin temperature needs to be appropriately adjusted to the recrystallization temperature (Tc2) of the polyarylene sulfide resin or higher and is, furthermore, preferably 240° C. or higher and more preferably 250° C. or higher. The upper limit is not particularly limited as long as the resin does not decompose, but is preferably 370° C. or lower. Furthermore, in a case where the molded article exhibits sufficient adhesion while maintaining excellent smoothness or appearance like the film-shaped matter, it is preferable to appropriately adjust the resin temperature to the recrystallization temperature (Tc2) or higher and lower than the melting point. Meanwhile, in a case where there is a demand for the molded article exhibiting more excellent adhesion while suppressing the generation of gas due to the decomposition of the resin or the deterioration of the resin, the resin temperature is preferably appropriately adjusted to the melting point or higher, furthermore, more preferably appropriately adjusted to the melting point or higher and the melting point plus 100° C. or lower, and furthermore, particularly preferably appropriately adjusted to the melting point plus 20° C. or higher and the melting point plus 50° C. or lower. In addition, the pressure condition for compressing the metal member and the molded article (pressing both against each other) is not particularly limited as long as the joining state can be held, and, for example, the pressure in a direction in which the metal member and the resin member are pressed against each other needs to be appropriately adjusted to 0.01 [MPa] or more, preferably 0.01 [MPa] or more and 100 [MPa] or less, and more preferably 0.1 [MPa] or more and 50 [MPa] or less from the beginning of heating through the completion of cooling such that the amount of burrs generated becomes small while sufficient adhesion is exhibited. It should be noted that, in the case of the laser welding method, it is not always necessary to press the metal member and the molded article against each other with an external force before welding, and the metal member and the molded article can be joined to each other using an increase in pressure caused in the joint interface due to the volumes expanded during melting.

(Applications of Composite Structure)

Regarding the examples of the major applications of the composite structure of the present invention, the composite structure is applicable to casings of electronic equipment such as a variety of home appliances, mobile phones, and personal computers (PCs), electric and electronic components represented by protective/supporting members/a plurality of individual semiconductors or modules for box-shaped electric and electronic component integrated modules, sensors, LED lamps, connectors, sockets, resistors, relay cases, switches, coil bobbins, capacitors, variable capacitor cases, optical pickups, oscillators, a variety of terminal boards, transformers, plugs, printed circuit boards, tuners, speakers, microphones, headphones, small motors, magnetic head bases, power modules, terminal blocks, semiconductors, liquid crystals, FDD carriages, FDD chassis, motor brush holders, parabolic antennas, computer-related components, and the like; household and office electric product components represented by audio/video equipment components such as VTR components, television components, irons, hair dryers, rice cooker components, microwave components, acoustic components, audio/laser disks/ compact disks/DVD disks/Blu-ray disks, lighting components, refrigerator components, air conditioner components, typewriter components, word processor components, water supply equipment components such as how water amount or temperature sensors for water heaters or baths, and the like; office computer related parts; machine-related components represented by office computer-related components, telephone-related components, facsimile-related components, copier-related components, cleaning jigs, motor components, writers, typewriters: optical equipment represented by microscopes, binoculars, cameras, watches, and the like, precision machine-related components; alternator terminals, alternator connectors, brush holders, slip rings, IC regulators, potentiometer bases for light dimmers, relay blocks, inhibitor switches, a variety of valves such as exhaust gas valves, a variety of fuel-related/exhaust system/intake system pipes, air intake nozzle snorkels, intake manifolds, fuel pumps, engine cooling water joints, carburetor main bodies, carburetor spacers, exhaust gas sensors, cooling water sensors, oil temperature sensors, brake pad wear sensors, throttle position sensors, crankshaft position sensors, air flow meters, brake pad abrasion sensors, thermostat bases for air conditioners, heating air flow control valves, brush holders for radiator motors, water pump impellers, turbine vanes, wiper motor-related components, distributors, starter switches, ignition coils and bobbins thereof, motor insulators, motor rotors, motor cores, starter relays, wire harnesses for transmission, window washer nozzles, air conditioner panel switch boards, coils for fuel-related electromagnetic valves, connectors for fuses, horn terminals, insulating boards for electric components, step motor rotors, lamp sockets, lamp reflectors, lamp housings, brake pistons, solenoid bobbins, engine oil filters, ignitor cases, power modules, inverters, power devices, intelligent power modules, insulated gate bipolar transistors, power control units, reactors, converters, capacitors, insulators, motor terminal blocks, batteries, electric compressors, battery current sensors, junction blocks, automobile/vehicle-related components such as cases that store an ignition coil for a DLI system, and a variety of other applications.

EXAMPLES

Hereinafter, the present invention will be more specifically described using specific examples. In addition, unless particularly otherwise described, 'parts' and '%' are mass-based.

(Measurement Example 1) Measurement of Melt Viscosity of Polyphenylene Sulfide Resin The melt viscosity was measured using a capillary type flow tester (Shimadzu Corporation, CFT-500D) after holding a polyarylene sulfide resin at 300° C. for six minutes with a load of $1.96 \times 10^6$ Pa and L/D=10 (mm)/1 (mm).

(Reference/Measurement Example 2) Measurement of Line Roughness of Metal Surface (Rz and RSm)

The surface roughness of the roughened surface of a metal member was evaluated based on JIS-B 0601-2001 (ISO 4287) using a stylus-type surface roughness tester (SURF-COM 1400D, manufactured by Tokyo Seimitsu Co., Ltd.). A spherical indenter (the tip radius was 2 µm) was used, and the maximum height (Rz) of the roughness curve and the average length (RSm) of the roughness curve elements were obtained from a roughness curve for which an evaluation length of 4 mm, a scanning rate of 0.06 mm/s, a reference length of 0.8 mm, a low cutoff wavelength of 2.5 µm, and a Gaussian filter as a cut-off filter were used. The measurement places were two random straight line portions that had a parallel relationship with each other on the roughened surface of the metal member and two random straight line portions that had a perpendicular relationship with the above-described straight line portions, and values obtained by averaging the values of the above-described parameters in a total of four straight lines were used.

(Measurement Example 3) Measurement of Surface Roughness of Metal Surface (Sdr)

The surface roughness of the roughened surface of the metal member was evaluated by a method based on ISO 25178 using a confocal microscope (manufactured by Lasertec Corporation, OPTELICS HYBRID). A white light source was used, and a confocal mode was used. As the objective lens, selected was an objective lens having a magnification with which one side of the visual field range reached twice to 10 times the average length (RSm) of the roughness curve elements obtained in Measurement Example 2. The scan resolution in the height direction was set to 10 nm, and an original surface image of the three-dimensional height of the roughened metal surface was obtained in a search peak mode. After a surface inclination correction was performed on the original surface image, the surface filter treatment of an S filter 2.5 µm and an L filter 0.8 µm (both were Gaussian filters) was performed, furthermore, all of the image obtained by applying a median filter for noise cut (the filter size was 3×3) once was regarded as the evaluation range, and the developed area ratio (Sdr) of the interface of the roughened metal member was obtained. The measurement places were five points at the center and five corners of the joint surface (3), and the value of Sdr obtained by averaging the values at the five points was used.

(Measurement Example 4) Measurement of Joint Strength of Composite Structure

On a composite structure (type-B composite structure based on ISO 19095), shear tension measurement was performed at a tension rate of 5 mm/min using a material testing device (Shimadzu Corporation, AG-IS). The measurement temperature was room temperature, and the average value (n=5) of the maximum values of stress that increased until the composite structure broke was regarded as the joint strength.

(Measurement Example 5) Heat Cycle Test of Composite Structure (Heat Cycle Resistance)

The composite structure (type-B composite structure based on ISO 19095) was introduced into an air to air thermal shock chamber (Espec Corp. "TSA-103EL"), and a heat cycle of −40° C./30 minutes→160° C./30 minutes was performed 100 cycles (one cycle for one hour). A "shear tension test" was performed according to Measurement Example 4 on the composite structure that had been subjected to the heat cycle test, and the joint strength after the heat cycle test was obtained.

The joint strength before the heat cycle test was defined as "initial joint strength", and "(joint strength after heat cycle test)/(joint strength before heat cycle test)×100" was defined as the retention rate (%). As the retention rate increases, the heat cycle resistance becomes more excellent.

(Production Example 1) Production of
Polyphenylene Sulfide Resin (1)

[Step 1]

33.075 parts by mass (225 parts by mol) of p-dichlorobenzene (hereinafter, abbreviated as "p-DCB"), 3.420 parts by mass (34.5 parts by mol) of NMP, 27.300 parts by mass (230 parts by mol in terms of NaSH) of a 47.23% by mass NaSH aqueous solution, and 18.533 parts by mass (228 parts by mol in terms of NaOH) of a 49.21% by mass NaOH aqueous solution were charged into a 150-liter autoclave equipped with a stirring blade to which a pressure gauge, a thermometer, a condenser, a decanter, and a rectifying tower were connected, heated up to 173° C. over five hours in a nitrogen atmosphere under stirring to distill away 27.300 parts by mass of water, and then the autoclave was sealed. p-DCB distilled away by azeotropy during dehydration was separated with the decanter and was often returned to the autoclave. In the autoclave after the completion of dehydration, a fine particulate anhydrous sodium sulfide composition was present in a state of being dispersed in p-DCB. Since the content of NMP in this composition was 0.079 parts by mass (0.8 parts by mol), it was shown that 98% by mol (33.7 parts by mol) of the charged NMP was hydrolyzed into a sodium salt of a ring-opened body (4-(methylamino) butyric acid) of NMP (hereinafter, abbreviated as "SMAB"). The amount of SMAB in the autoclave was 0.147 parts by mol per mol of sulfur atoms present in the autoclave. Since the theoretical dehydration amount is 27.921 parts by mass in a case where NaSH and NaOH, which were charged into the autoclave, are fully changed to anhydrous $Na_2S$, it is shown that 0.609 parts by mass (33.8 parts by mol) of the amount of water remaining in the autoclave (0.878 parts by mass, 48.8 parts by mol) was consumed for the hydrolysis reaction between NMP and NaOH and was not present in the autoclave as water, and the remaining 0.269 parts by mass (14.9 parts by mol) of water remained in the autoclave in a form of water or crystal water. The amount of moisture in the autoclave was 0.065 mol per mol of sulfur atoms present in the autoclave.

[Step 2]

After the completion of the dehydration step, the internal temperature was cooled to 160° C., and 46.343 parts by mass (467.5 parts by mol) of NMP was charged and heated up to 185° C. The amount of moisture in the autoclave was 0.025 mol per mol of NMP that was charged in Step 2. When the gauge pressure reached 0.00 MPa, the valve connected to the rectifying tower was opened, and the internal temperature was raised up to 200° C. over one hour. At this time, cooling and the opening degree of the valve were controlled such that the outlet temperature of the rectifying tower reached 110° C. or lower. The vapor mixture of the distilled p-DCB and water was condensed with the condenser and separated with the decanter, and p-DCB was returned to the autoclave. The amount of distilled water was 0.228 parts by mass (12.7 parts by mol).

[Step 3]

The amount of moisture in the autoclave in the beginning of Step 3 was 0.041 parts by mass (2.3 parts by mol), was 0.005 mol per mol of NMP that was charged in Step 2, and was 0.010 mol per mol of sulfur atoms present in the autoclave. The amount of SMAB in the autoclave was, similar to that in Step 1, 0.147 parts by mol per mol of sulfur atoms present in the autoclave. Next, the internal temperature was raised from 200° C. to 230° C. over three hours, and the anhydrous sodium sulfide composition was stirred at 230° C. for one hour, then, heated up to 250° C., and stirred for one hour. The gauge pressure at an internal temperature of 200° C. was 0.03 MPa, and the final gauge pressure was 0.40 MPa. After cooling, 0.650 parts by mass of the obtained slurry was poured into 3 parts by mass (3 parts by liter) of water, stirred at 80° C. for one hour, and then filtered. This cake was stirred again in 3 parts by mass (3 parts by liter) of warm water for one hour, washed, and then filtered. This operation was repeated four times. The pH of this cake was adjusted to 4.0 by adding again 3 parts by mass (3 parts by liter) of warm water and acetic acid, and then the cake was stirred for 1 hour, washed, and then filtered. This cake was stirred again in 3 parts by mass (3 parts by liter) of warm water for one hour, washed, and then filtered. This operation was repeated twice. The cake was dried overnight at 120° C. using a hot air dryer, thereby obtaining a white powder-form PPS resin (1). The melt viscosity of this polymer at 300° C. was 56 Pa·s. The non-Newtonian index was 1.07.

(Production Example 2) Production of
Polyphenylene Sulfide Resin (2)

19.413 parts by mass of flaky sodium sulfide (60.3% by mass $Na_2S$) and 45.000 parts by mass of NMP were charged into a 150-liter autoclave equipped with a stirring blade and a bottom valve to which a pressure gauge, a thermometer, and a condenser were connected. The components were heated up to 209° C. while being stirred under a nitrogen stream to distill away 4.644 parts by mass of water (the amount of residual water was 1.13 mol per mol of sodium sulfide). After that, the autoclave was sealed and cooled to 180° C., and 23.211 parts by mass of paradichlorobenzene and 18.000 parts by mass of NMP were charged. The components were pressurized to a gauge pressure of 0.1 MPa at a liquid temperature of 150° C. using nitrogen gas to begin to raise the temperature. A reaction was caused to proceed while stirring the components at a liquid temperature of 260° C. for three hours, and the upper portion of the autoclave was cooled by watering. Next, when the temperature was decreased, the cooling of the upper portion of the autoclave was stopped. During the cooling of the upper portion of the autoclave, the liquid temperature was kept constant so as not to drop. The maximum pressure during the reaction was 0.85 MPa.

After the reaction, the components were cooled. After cooling, 0.650 parts by mass of the obtained slurry was poured into 3 parts by mass (3 parts by liter) of water, stirred at 80° C. for one hour, and then filtered. This cake was stirred again in 3 parts by mass (3 parts by liter) of warm water for one hour, washed, and then filtered. This operation was repeated seven times. The cake was dried overnight at 120° C. using the hot air dryer.

After that, a heat treatment was performed with the hot air dryer at 240° C. for three hours, and a PPS resin (2) was obtained. The melt viscosity of the obtained polymer was 28 Pa·s, and the non-Newtonian index was 1.21.

(Production Example 3) Production of
Polyphenylene Sulfide Resin (3)

[Step 1]

33.222 parts by mass (226 parts by mol) of p-dichlorobenzene (hereinafter, abbreviated as "p-DCB"), 3.420 parts by mass (34.5 parts by mol) of NMP, 27.300 parts by mass (230 parts by mol in terms of NaSH) of a 47.23% by mass NaSH aqueous solution, and 18.533 parts by mass (228 parts by mol in terms of NaOH) of a 49.21% by mass NaOH aqueous solution were charged into a 150-liter autoclave equipped with a stirring blade to which a pressure gauge, a thermometer, a condenser, a decanter, and a rectifying tower were connected, heated up to 173° C. over five hours in a nitrogen atmosphere under stirring to distill away 27.300 parts by mass of water, and then the autoclave was sealed. p-DCB distilled away by azeotropy during dehydration was separated with the decanter and was often returned to the autoclave. In the autoclave after the completion of dehydration, a fine particulate anhydrous sodium sulfide composition was present in a state of being dispersed in p-DCB. Since the content of NMP in this composition was 0.079 parts by mass (0.8 parts by mol), it was shown that 98% by mol (33.7 parts by mol) of the charged NMP was hydrolyzed into a sodium salt of a ring-opened body (4-(methylamino) butyric acid) of NMP (hereinafter, abbreviated as "SMAB"). The amount of SMAB in the autoclave was 0.147 parts by mol per mol of sulfur atoms present in the autoclave. Since the theoretical dehydration amount is 27.921 parts by mass in a case where NaSH and NaOH, which were charged into the autoclave, are fully changed to anhydrous $Na_2S$, it is shown that 0.609 parts by mass (33.8 parts by mol) of the amount of water remaining in the autoclave (0.878 parts by mass, 48.8 parts by mol) was consumed for the hydrolysis reaction between NMP and NaOH and was not present in the autoclave as water, and the remaining 0.269 parts by mass (14.9 parts by mol) of water remained in the autoclave in a form of water or crystal water. The amount of moisture in the autoclave was 0.065 mol per mol of sulfur atoms present in the autoclave.

[Step 2]

After the completion of the dehydration step, the internal temperature was cooled to 160° C., and 46.343 parts by mass (467.5 parts by mol) of NMP was charged and heated up to 185° C. The amount of moisture in the autoclave was 0.025 mol per mol of NMP that was charged in Step 2. When the gauge pressure reached 0.00 MPa, the valve connected to the rectifying tower was opened, and the internal temperature was raised up to 200° C. over one hour. At this time, cooling and the opening degree of the valve were controlled such that the outlet temperature of the rectifying tower reached 110° C. or lower. The vapor mixture of the distilled p-DCB and water was condensed with the condenser and separated with the decanter, and p-DCB was returned to the autoclave. The amount of distilled water was 0.228 parts by mass (12.7 parts by mol).

[Step 3]

The amount of moisture in the autoclave in the beginning of Step 3 was 0.041 parts by mass (2.3 parts by mol), was 0.005 mol per mol of NMP that was charged in Step 2, and was 0.010 mol per mol of sulfur atoms present in the autoclave. The amount of SMAB in the autoclave was, similar to that in Step 1, 0.147 parts by mol per mol of sulfur atoms present in the autoclave. Next, the internal temperature was raised from 200° C. to 230° C. over three hours, and the anhydrous sodium sulfide composition was stirred at 230° C. for three hours, then, heated up to 250° C., and stirred for one hour. The gauge pressure at an internal temperature of 200° C. was 0.03 MPa, and the final gauge pressure was 0.40 MPa. After cooling, 0.650 parts by mass of the obtained slurry was poured into 3 parts by mass (3 parts by liter) of water, stirred at 80° C. for one hour, and then filtered. This cake was stirred again in 3 parts by mass (3 parts by liter) of warm water for one hour, washed, and then filtered. This operation was repeated four times. The pH of this cake was adjusted to 4.0 by adding again 3 parts by mass (3 parts by liter) of warm water and acetic acid, and then the cake was stirred for 1 hour, washed, and then filtered. This cake was stirred again in 3 parts by mass (3 parts by liter) of warm water for one hour, washed, and then filtered. This operation was repeated twice. The cake was dried overnight at 120° C. using a hot air dryer, thereby obtaining a white powder-form PPS resin (3). The melt viscosity of this polymer at 300° C. was 180 Pa·s. The non-Newtonian index was 1.07.

(Production Example 4) Production of Polyphenylene Sulfide Resin (4)

19.413 parts by mass of flaky sodium sulfide (60.3% by mass $Na_2S$) and 45.000 parts by mass of NMP were charged into a 150-liter autoclave equipped with a stirring blade and a bottom valve to which a pressure gauge, a thermometer, and a condenser were connected. The components were heated up to 209° C. while being stirred under a nitrogen stream to distill away 4.644 parts by mass of water (the amount of residual water was 1.13 mol per mol of sodium sulfide). After that, the autoclave was sealed and cooled to 180° C., and 22.05 parts by mass of paradichlorobenzene and 18.000 parts by mass of NMP were charged. The components were pressurized to a gauge pressure of 0.1 MPa at a liquid temperature of 150° C. using nitrogen gas to begin to raise the temperature. A reaction was caused to proceed while stirring the components at a liquid temperature of 260° C. for three hours, and the upper portion of the autoclave was cooled by watering. Next, when the temperature was decreased, the cooling of the upper portion of the autoclave was stopped. During the cooling of the upper portion of the autoclave, the liquid temperature was kept constant so as not to drop. The maximum pressure during the reaction was 0.85 MPa.

After the reaction, the components were cooled. After cooling, 0.650 parts by mass of the obtained slurry was poured into 3 parts by mass (3 parts by liter) of water, stirred at 80° C. for one hour, and then filtered. This cake was stirred again in 3 parts by mass (3 parts by liter) of warm water for one hour, washed, and then filtered. This operation was repeated seven times. The cake was dried overnight at 120° C. using the hot air dryer.

After that, a heat treatment was performed with the hot air dryer at 250° C. for three hours, and a PPS resin (4) was obtained. The melt viscosity of the obtained polymer was 700 Pa·s, and the non-Newtonian index was 1.60.

(Production Example 5) Production of Polyphenylene Sulfide Resin (5) for Comparative Example

[Step 1]

35.868 parts by mass (244 parts by mol) of p-dichlorobenzene, 3.420 parts by mass (34.5 parts by mol) of NMP, 27.300 parts by mass (230 parts by mol in terms of NaSH) of a 47.23% by mass NaSH aqueous solution, and 18.533 parts by mass (228 parts by mol in terms of NaOH) of a 49.21% by mass NaOH aqueous solution were charged into a 150-liter autoclave equipped with a stirring blade to which a pressure gauge, a thermometer, a condenser, a decanter, and a rectifying tower were connected, heated up to 173° C. over five hours in a nitrogen atmosphere under stirring to distill away 27.300 parts by mass of water, and then the autoclave was sealed. p-DCB distilled away by azeotropy during dehydration was separated with the decanter and was often returned to the autoclave. In the autoclave after the completion of dehydration, a fine particulate anhydrous sodium sulfide composition was present in a state of being dispersed in p-DCB. Since the content of NMP in this composition was 0.079 parts by mass (0.8 parts by mol), it was shown that 98% by mol (33.7 parts by mol) of the charged NMP was hydrolyzed into a sodium salt of a ring-opened body (4-(methylamino)butyric acid) of NMP (hereinafter, abbreviated as "SMAB"). The amount of SMAB in the autoclave was 0.147 parts by mol per mol of sulfur atoms present in the autoclave. Since the theoretical dehydration amount is 27.921 parts by mass in a case where NaSH and NaOH, which were charged into the autoclave, are fully changed to anhydrous $Na_2S$, it is shown that 0.609 parts by mass (33.8 parts by mol) of the amount of water remaining in the autoclave (0.878 parts by mass, 48.8 parts by mol) was consumed for the hydrolysis reaction between NMP and NaOH and was not present in the autoclave as water, and the remaining 0.269 parts by mass (14.9 parts by mol) of water remained in the autoclave in a form of water or crystal water. The amount of moisture in the autoclave was 0.065 mol per mol of sulfur atoms present in the autoclave.

[Step 2]

After the completion of the dehydration step, the internal temperature was cooled to 160° C., and 46.343 parts by mass (467.5 parts by mol) of NMP was charged and heated up to 185° C. The amount of moisture in the autoclave was 0.025 mol per mol of NMP that was charged in Step 2. When the gauge pressure reached 0.00 MPa, the valve connected to the rectifying tower was opened, and the internal temperature was raised up to 200° C. over one hour. At this time, cooling and the opening degree of the valve were controlled such that the outlet temperature of the rectifying tower reached 110° C. or lower. The vapor mixture of the distilled p-DCB and water was condensed with the condenser and separated with the decanter, and p-DCB was returned to the autoclave. The amount of distilled water was 0.228 parts by mass (12.7 parts by mol).

[Step 3]

The amount of moisture in the autoclave in the beginning of Step 3 was 0.041 parts by mass (2.3 parts by mol), was 0.005 mol per mol of NMP that was charged in Step 2, and was 0.010 mol per mol of sulfur atoms present in the autoclave. The amount of SMAB in the autoclave was, similar to that in Step 1, 0.147 parts by mol per mol of sulfur atoms present in the autoclave. Next, the internal temperature was raised from 200° C. to 230° C. over three hours, and the anhydrous sodium sulfide composition was stirred at 230° C. for one hour, then, heated up to 250° C., and stirred for one hour. The gauge pressure at an internal temperature of 200° C. was 0.03 MPa, and the final gauge pressure was 0.40 MPa. After cooling, 0.650 parts by mass of the obtained slurry was poured into 3 parts by mass (3 parts by liter) of water, stirred at 80° C. for one hour, and then filtered. This cake was stirred again in 3 parts by mass (3 parts by liter) of warm water for one hour, washed, and then filtered. This operation was repeated four times. The pH of this cake was adjusted to 4.0 by adding again 3 parts by mass (3 parts by liter) of warm water and acetic acid, and then the cake was stirred for 1 hour, washed, and then filtered. This cake was stirred again in 3 parts by mass (3 parts by liter) of warm water for one hour, washed, and then filtered. This operation was repeated twice. The cake was dried overnight at 120° C. using a hot air dryer, thereby obtaining a white powder-form PPS resin (5). The melt viscosity of this polymer at 300° C. was 7 Pa·s. The non-Newtonian index was 1.07.

(Production Example 6) Production of Polyphenylene Sulfide Resin Compositions

Individual materials were uniformly mixed in a tumbler according to the composition components and the blending amounts (all in parts by mass) shown in Table 1. After that, the blended materials were charged into a twin-screw extruder equipped with a vent (The Japan Steel Works, LTD., TEX30a) and melted and kneaded under conditions of an amount of the resin component discharged set to 30 kg/hr, a screw rotation speed set to 220 rpm, and a resin temperature set to 320° C., thereby obtaining pellets of the polyphenylene sulfide resin composition (A-1 to A-8).

(Production Example 7-1) Production of Metal Member (B-0)

No treatment: Metal members (B-0) were cut out from plates of aluminum die cast (ADC12), aluminum (A5052), and copper (C1100) into a size (length×width×thickness) of 45 mm×10 mm×1.5 mm. The maximum height roughness (Rz) of the roughness curves and the average lengths (RSm) of the roughness curve elements of the obtained metal members were evaluated according to Measurement Example 2. In addition, the developed area ratios (Sdr0) of the interface of the metal members were evaluated according to Measurement Example 3. The results are shown in Tables 2 to 6.

(Production Example 7-2) Production of Metal Member (B-1)

Two-stage chemical treatment: The metal member (B-0) of ADC12 was immersed in a 5% sodium hydroxide aqueous solution (50° C.) for 20 seconds to perform a first surface roughening step. Subsequently, as a second surface roughening step, the metal member (B-0) was immersed in a corrosive aqueous solution obtained by mixing 67.5% nitric acid and 55% hydrofluoric acid at a volume ratio of 9:1 for 20 seconds to obtain a metal member (B-1). The maximum height roughness (Rz) of the roughness curve and the average length (RSm) of the roughness curve elements of the obtained metal member were evaluated according to Measurement Example 2. In addition, the developed area ratio (Sdr1) of the interface of the metal member was evaluated according to Measurement Example 3. The results are shown in Tables 2 to 5. In addition, the ratios (Sdr1/Sdr0) to the developed area ratios (Sdr0) of the interface of the metal members (B-0) that had not been surface-roughened are obtained from Sdr of the roughened metal members and shown in Tables 2 to 6. This shall apply below.

(Production Example 7-3) Production of Metal Member (B-1a)

One-stage chemical treatment: Only the first surface roughening step in Production Example 2-2 was performed on the metal member (B-0) of ADC12 to obtain a metal member (B-1a).

(Production Example 7-4) Production of Metal Member (B-1b)

Two-stage chemical treatment, low concentration: The two-stage chemical treatment was performed by the same method as in Production Example 2-2, but was performed in a low-concentration corrosive aqueous solution. That is, the metal member (B-0) of ADC12 was immersed in a 2% sodium hydroxide aqueous solution (50° C.) for 20 seconds to perform a first surface roughening step. Subsequently, the metal member (B-0) was immersed in a corrosive aqueous solution obtained by mixing 15% nitric acid and 10% hydrofluoric acid at a volume ratio of 9:1 for 20 seconds to perform the second surface roughening step, thereby producing a metal member (B-1b).

(Production Example 7-5) Production of Metal Member (B-1c)

Two-stage chemical treatment, short time: The two-stage chemical treatment was performed by the same method as in Production Example 2-2, but the metal member (B-0) was immersed in the corrosive aqueous solution only for a shorter period of time. That is, the metal member (B-0) of ADC12 was immersed in a 5% sodium hydroxide aqueous solution (50° C.) for 10 seconds to perform a first surface roughening step. Subsequently, the metal member (B-0) was immersed in a corrosive aqueous solution obtained by mixing 67.5% nitric acid and 55% hydrofluoric acid at a volume ratio of 9:1 for 10 seconds to perform the second surface roughening step, thereby producing a metal member (B-1c).

(Production Example 7-6) Production of Metal Member (B-2)

Shot blasting: Shot blasting was performed on the metal member (B-0) of ADC12 with an aluminum abrasive for 180 seconds to obtain a metal member (B-2).

(Production Example 7-7) Production of Metal Member (B-3)

Shot blasting: Shot blasting was performed on the metal member (B-0) of ADC12 with a steel grid abrasive for 60 seconds to obtain a metal member (B-3).

(Production Example 7-8) Production of Metal Members (B-4)

A D process treatment by MEC Co., Ltd. was performed on metal pieces (B-0) of ADC12 and A5052, and an A-10201 treatment by the same company was performed on a metal piece (B-0) of C1110, thereby obtaining metal members (B-4).

Producing of Composite Structures and Evaluation of Joint Strengths

Examples 1 to 11 and Comparative Examples 1 to 8

The metal members obtained in Production Examples 7-2 to 7-8 were preliminarily heated to 200° C. on a hot plate and then set in a mold (the mold temperature was 140° C.) of an injection molding machine (Sumitomo Heavy Industries, Ltd., SV-50M). The pellets (A-1 to A-8) of the polyphenylene sulfide resin compositions were insert-molded at a screw temperature of 320° C. such that the surface-roughened portions (10 mm×5 mm) of the metal pieces and the resin compositions were joined to each other, thereby obtaining composite structures (Type-B composite structures based on ISO 19095). The obtained composite structures were annealed at 160° C. for 100 hours, and the joint strengths and the retention rates were obtained according to Measurement Example 4 and Measurement Example 5. The results are shown in Tables 2 to 6.

TABLE 1

| PPS resin composition | A-1 | A-2 | A-3 | A-4 | A-5 | A-6 | A-7 | A-8 |
|---|---|---|---|---|---|---|---|---|
| PPS resin (1) | 60 | 59 | 55 | 100 | | | | |
| PPS resin (2) | | | | | 60 | | | |
| PPS resin (3) | | | | | | 60 | | |
| PPS resin (4) | | | | | | | 60 | |
| PPS resin (5) | | | | | | | | 60 |
| Glass fiber | 40 | 40 | 40 | 0 | 40 | 40 | 40 | 40 |
| Elastomer | 0 | 0 | 5 | 0 | 0 | 0 | 0 | 0 |
| Phenol novolac | 0 | 1 | 0 | 0 | 0 | 0 | 0 | 0 |

TABLE 2

| | Example 1 | Example 2 | Example 3 | Example 4 |
|---|---|---|---|---|
| PPS resin composition | A-1 | A-1 | A-1 | A-1 |
| Metal member | ADC12 | ADC12 | ADC12 | ADC12 |
| Metal surface roughening | B-1 | B-1a | B-1c | B-4 |
| Surface roughness parameter | | | | |
| Sdr [%] | 32.0 | 5.1 | 18.0 | 34.0 |
| Sdr1/Sdr0 | 45.7 | 7.3 | 25.7 | 48.6 |
| RSm [µm] | 46 | 56 | 60 | 54 |
| Rz [µm] | 5 | 2 | 4 | 7 |
| Evaluation | | | | |
| Initial joint strength [MPa] | 30 | 17 | 20 | 30 |
| Heat cycle resistance | | | | |
| Joint strength [MPa] (upper row) | 27 | 12 | 15 | 27 |
| Retention rate [%] (lower row) | 90 | 71 | 79 | 90 |

TABLE 3

| | Example 5 | Example 6 | Example 7 | Example 8 |
|---|---|---|---|---|
| PPS resin composition | A-1 | A-1 | A-2 | A-3 |
| Metal member | A5052 | C1100 | ADC12 | ADC12 |
| Metal surface roughening | B-4 | B-4 | B-1 | B-1 |
| Surface roughness parameter | | | | |
| Sdr [%] | 30.0 | 22.5 | 32.0 | 32.0 |
| Sdr1/Sdr0 | 7.9 | 32.1 | 45.7 | 45.7 |
| RSm [µm] | 140 | 36 | 46 | 46 |
| Rz [µm] | 22 | 5 | 5 | 5 |
| Evaluation | | | | |
| Initial joint strength [MPa] | 27 | 28 | 39 | 40 |
| Heat cycle resistance | | | | |
| Joint strength [MPa] (upper row) | 22 | 25 | 36 | 40 |
| Retention rate [%] (lower row) | 81 | 89 | 92 | 100 |

TABLE 4

|  | Example 9 | Example 10 | Example 11 |
|---|---|---|---|
| PPS resin composition | A-4 | A-5 | A-6 |
| Metal member | ADC12 | ADC12 | ADC12 |
| Metal surface roughening | B-1 | B-1 | B-1 |
| Surface roughness parameter | | | |
| Sdr [%] | 32.0 | 32.0 | 32.0 |
| Sdr1/Sdr0 | 45.7 | 45.7 | 45.7 |
| RSm [μm] | 46 | 46 | 46 |
| Rz [μm] | 5 | 5 | 5 |
| Evaluation | | | |
| Initial joint strength [MPa] | 52 | 31 | 27 |
| Heat cycle resistance | | | |
| Joint strength [MPa] (upper row) | 35 | 28 | 15 |
| Retention rate [%] (lower row) | 67 | 90 | 56 |

TABLE 5

|  | Comparative Example 1 | Comparative Example 2 | Comparative Example 3 | Comparative Example 4 |
|---|---|---|---|---|
| PPS resin composition | A-1 | A-1 | A-1 | A-1 |
| Metal member | ADC12 | ADC12 | ADC12 | ADC12 |
| Metal surface roughening | B-1b | B-2 | B-3 | B-0 |
| Surface roughness parameter | | | | |
| Sdr [%] | 2.9 | 1.0 | 4.4 | 0.7 |
| Sdr1/Sdr0 | 4.1 | 1.4 | 6.3 | 1.0 |
| RSm [μm] | 76 | 138 | 126 | 107 |
| Rz [μm] | 2 | 8 | 7 | 2 |
| Evaluation | | | | |
| Initial joint strength [MPa] | 6 | NG*1 | 1 | NG*1 |
| Heat cycle resistance | | | | |
| Joint strength [MPa] (upper row) | NG*2 | — | NG*2 | — |
| Retention rate [%] (lower row) | 0 | | 0 | |

*1 PPS resin-molded member and metal member are not joined
*2 PPS resin-molded member and metal member peel off

TABLE 6

|  | Comparative Example 5 | Comparative Example 6 | Comparative Example 7 | Comparative Example 8 |
|---|---|---|---|---|
| PPS resin composition | A-1 | A-1 | A-7 | A-8 |
| Metal member | A5052 | C1100 | ADC12 | ADC12 |
| Metal surface roughening | B-0 | B-0 | B-1 | B-1 |
| Surface roughness parameter | | | | |
| Sdr [%] | 3.8 | 0.7 | 32.0 | 32.0 |
| Sdr1/Sdr0 | 1.0 | 1.0 | 45.7 | 45.7 |
| RSm [μm] | 101 | 66 | 46 | 46 |
| Rz [μm] | 2 | 0.4 | 5 | 5 |
| Evaluation | | | | |
| Initial joint strength [MPa] | NG*1 | NG*1 | 3 | 9 |
| Heat cycle resistance | | | | |
| Joint strength [MPa] (upper row) | — | — | NG*2 | 7 |
| Retention rate [%] (lower row) | | | 0 | 78 |

It should be noted that the blending ratios of the polyphenylene sulfide resin compositions in the table are indicated in "parts by mass", and the following matters were used.

Glass fiber: Chopped strand fiber length 200 μm, average diameter 10 μm

Elastomer: "BONDFAST-7L" manufactured by Sumitomo Chemical Co., Ltd. (ethylene-glycidyl dimethacrylate-vinyl acetate)

Phenol Novolac: "PHENOLITE TD-2090" manufactured by DIC Corporation

REFERENCE SIGNS LIST

1: Metal member
2: Molded article of polyarylene sulfide resin composition
3: Joint surface between metal member and molded article of polyarylene sulfide resin

The invention claimed is:

1. A composite structure comprising a surface-roughened metal member and a resin member made of a molded article formed by melting and molding a polyarylene sulfide resin composition containing a polyarylene sulfide resin (A), which are joined to each other,
    wherein a number average value of developed area ratios (Sdr) of an interface measured at five random points on a surface of the surface-roughened metal member using a confocal microscope based on ISO 25178 is 5% or more,
    a maximum height roughness (Rz) of four random straight line points on a surface of the surface-roughened metal member using a stylus-type roughness meter based on ISO 4287 is 2 μm or more and 30 μm or less,
    an average length (RSm) of four random straight line points on a surface of the surface-roughened metal member using a stylus-type roughness meter based on ISO 4287 is 10 μm or more and less than 100 μm, and
    a melt viscosity of the polyarylene sulfide resin, measured using a capillary type flow tester after holding the polyarylene sulfide resin at 300° C. for six minutes with a load of $1.96 \times 10^6$ Pa and L/D=10 (mm)/1 (mm), is 15 Pa·s or more and 500 Pa·s or less.

2. The composite structure according to claim 1, wherein the polyarylene sulfide resin composition is prepared by blending 1 part by mass or more and 150 parts by mass or less of a filler (B) with 100 parts by mass of the polyarylene sulfide resin (A), followed by melting and kneading.

3. The composite structure according to claim 1, wherein the polyarylene sulfide resin composition is prepared by blending 1 part by mass or more and 100 parts by mass or less of an elastomer (C) with 100 parts by mass of the polyarylene sulfide resin (A), followed by melting and kneading.

4. A method for producing a composite structure in which a surface-roughened metal member is joined to a resin member made of a molded article formed by melting and molding a polyarylene sulfide resin composition containing a polyarylene sulfide resin, the method comprising:
- a step (α) of melting and molding the polyarylene sulfide resin composition on a surface of a metal member to perform joining or a step (β) of joining the surface of the metal member and the molded article,
- wherein a number average value (Sdr0) of developed area ratios (Sdr) of an interface measured at five random points in the surface-roughened metal member using a confocal microscope based on ISO 25178 is 5% or more,
- a maximum height roughness (Rz) of four random straight line points on a surface of the surface-roughened metal member using a stylus-type roughness meter based on ISO 4287 is 2 μm or more and 30 μm or less,
- an average length (RSm) of four random straight line points on a surface of the surface-roughened metal member using a stylus-type roughness meter based on ISO 4287 is 10 μm or more and less than 100 μm, and
- a melt viscosity of the polyarylene sulfide resin, measured using a capillary type flow tester after holding the polyarylene sulfide resin at 300° C. for six minutes with a load of $1.96 \times 10^6$ Pa and L/D=10 (mm)/1 (mm), is 15 Pa·s or more and 500 Pa·s or less.

5. The method for producing a composite structure according to claim 4, further comprising:
- for preparing the surface-roughened metal member, a step of roughening the surface of the metal member,
- wherein a ratio (Sdr1/Sdr0) of a number average value (Sdr1) of the developed area ratios (Sdr) of the interface at five random points on the surface of the surface-roughened metal member to the number average value (Sdr0) of the developed area ratios (Sdr) of the interface at five random points on the surface of the metal member before roughening the surface is 7 or more.

6. The method for producing a composite structure according to claim 4,
- wherein the polyarylene sulfide resin composition is prepared by blending 1 part by mass or more and 200 parts by mass or less of a filler (B) with 100 parts by mass of the polyarylene sulfide resin (A), followed by melting and kneading.

7. The method for producing a composite structure according to claim 4,
- wherein the polyarylene sulfide resin composition is prepared by blending 0.01 parts by mass or more and 30 parts by mass or less of an elastomer (C) with 100 parts by mass of the polyarylene sulfide resin (A), followed by melting and kneading.

8. The composite structure according to claim 2,
- wherein the polyarylene sulfide resin composition is prepared by blending 1 part by mass or more and 100 parts by mass or less of an elastomer (C) with 100 parts by mass of the polyarylene sulfide resin (A), followed by melting and kneading.

9. The method for producing a composite structure according to claim 7,
- wherein the polyarylene sulfide resin composition is prepared by blending 1 part by mass or more and 200 parts by mass or less of a filler (B) with 100 parts by mass of the polyarylene sulfide resin (A), followed by melting and kneading.

10. The method for producing a composite structure according to claim 5,
- wherein the polyarylene sulfide resin composition is prepared by blending 0.01 parts by mass or more and 30 parts by mass or less of an elastomer (C) with 100 parts by mass of the polyarylene sulfide resin (A), followed by melting and kneading.

11. The method for producing a composite structure according to claim 6,
- wherein the polyarylene sulfide resin composition is prepared by blending 0.01 parts by mass or more and 30 parts by mass or less of an elastomer (C) with 100 parts by mass of the polyarylene sulfide resin (A), followed by melting and kneading.

12. The method for producing a composite structure according to claim 9,
- wherein the polyarylene sulfide resin composition is prepared by blending 0.01 parts by mass or more and 30 parts by mass or less of an elastomer (C) with 100 parts by mass of the polyarylene sulfide resin (A), followed by melting and kneading.

13. The composite structure according to claim 1,
- wherein the maximum height roughness (Rz) of four random straight line points on the surface of the surface-roughened metal member using a stylus-type roughness meter based on ISO 4287 is 5 μm or more and 22 μm or less.

14. The method for producing a composite structure according to claim 4,
- wherein the maximum height roughness (Rz) of four random straight line points on the surface of the surface-roughened metal member using a stylus-type roughness meter based on ISO 4287 is 5 μm or more and 22 μm or less.

* * * * *